United States Patent
Hayashita

(10) Patent No.: US 10,753,262 B2
(45) Date of Patent: Aug. 25, 2020

(54) CONTROL SYSTEM OF EXHAUST SENSOR

(71) Applicant: TOYOTA JIDOSHA KABUSHIKI KAISHA, Toyota-shi, Aichi-ken (JP)

(72) Inventor: Go Hayashita, Chigasaki (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 450 days.

(21) Appl. No.: 15/482,217

(22) Filed: Apr. 7, 2017

(65) Prior Publication Data
US 2017/0292433 A1    Oct. 12, 2017

(30) Foreign Application Priority Data

Apr. 11, 2016    (JP) .................... 2015-079167

(51) Int. Cl.
*G01N 11/00*    (2006.01)
*G01N 27/407*    (2006.01)
(Continued)

(52) U.S. Cl.
CPC .............. *F01N 11/007* (2013.01); *F01N 9/00* (2013.01); *G01N 27/4071* (2013.01);
(Continued)

(58) Field of Classification Search
CPC .. F01N 11/007; F01N 11/00–007; F01N 9/00; F01N 2560/02; F01N 2560/025; F01N 2560/20; F01N 9/005; G01N 27/4071; G01N 27/4075; G01N 27/4077; G01N 27/4067; G01N 27/409; G01N 27/41;
(Continued)

(56) References Cited

U.S. PATENT DOCUMENTS

| 2004/0026408 A1* | 2/2004 | Morinaga | .......... G01N 27/4067 219/497 |
| 2004/0086023 A1* | 5/2004 | Smith | .................. F02D 41/1494 374/141 |

(Continued)

FOREIGN PATENT DOCUMENTS

| CN | 102033093 A | * | 4/2011 | ......... G01N 27/4067 |
| JP | 2005105960 A | * | 4/2005 | |

(Continued)

*Primary Examiner* — James Lin
*Assistant Examiner* — Vivian A Tran
(74) *Attorney, Agent, or Firm* — Hunton Andrews Kurth LLP

(57) ABSTRACT

A control system of an exhaust sensor controlling an exhaust sensor comprises a heater control part controlling a heater and a temperature estimating part estimating a temperature of an exhaust pipe around the exhaust sensor. The heater control part sets the target temperature to a first target temperature after startup of the internal combustion engine and until the estimated temperature of the exhaust pipe reaches a first exhaust pipe temperature, sets the target temperature to a second target temperature from when the estimated temperature of the exhaust pipe reaches the first exhaust pipe temperature to when it reaches a second exhaust pipe temperature, and sets the target temperature to an operating temperature of the electrochemical cell when the estimated temperature of the exhaust pipe reaches the second exhaust pipe temperature.

14 Claims, 11 Drawing Sheets

(51) Int. Cl.
*G01N 27/406* (2006.01)
*F01N 11/00* (2006.01)
*F01N 9/00* (2006.01)

(52) U.S. Cl.
CPC ...... *G01N 27/4075* (2013.01); *F01N 2560/02* (2013.01); *F01N 2560/025* (2013.01); *F01N 2560/20* (2013.01); *G01N 27/4067* (2013.01); *Y02T 10/47* (2013.01)

(58) Field of Classification Search
CPC ............. G01N 27/406; G01N 27/4065; G01N 27/4175; Y02T 10/47; G01M 15/048; F02D 41/1438; F02D 41/1444–1447; F02D 41/1493–1495
See application file for complete search history.

(56) References Cited

U.S. PATENT DOCUMENTS

| | | | | |
|---|---|---|---|---|
| 2005/0252497 | A1* | 11/2005 | Yasui | F02D 41/1454 123/697 |
| 2009/0116534 | A1* | 5/2009 | Tabery | G01N 27/4118 374/45 |
| 2010/0059029 | A1* | 3/2010 | Hoshi | F02D 13/0203 123/703 |
| 2010/0300068 | A1* | 12/2010 | Enomoto | F02D 41/1494 60/273 |
| 2011/0246090 | A1* | 10/2011 | Goya | F02D 41/1494 702/24 |
| 2016/0018357 | A1 | 1/2016 | Nishijima et al. | |

FOREIGN PATENT DOCUMENTS

| | | | | |
|---|---|---|---|---|
| JP | 2006-220026 | A | | 8/2006 |
| JP | 2009-529691 | A | | 8/2009 |
| JP | 2012-093330 | A | | 5/2012 |
| JP | 2012172535 | A | * | 9/2012 |
| JP | 2012172535 | A | | 9/2012 |
| JP | 2013163978 | A | | 8/2013 |
| JP | 5864853 | B2 | * | 2/2016 ......... F02D 41/1494 |
| JP | 2016029360 | A | | 3/2016 |
| KR | 101294440 | B1 | * | 8/2013 |

* cited by examiner

FIG. 1
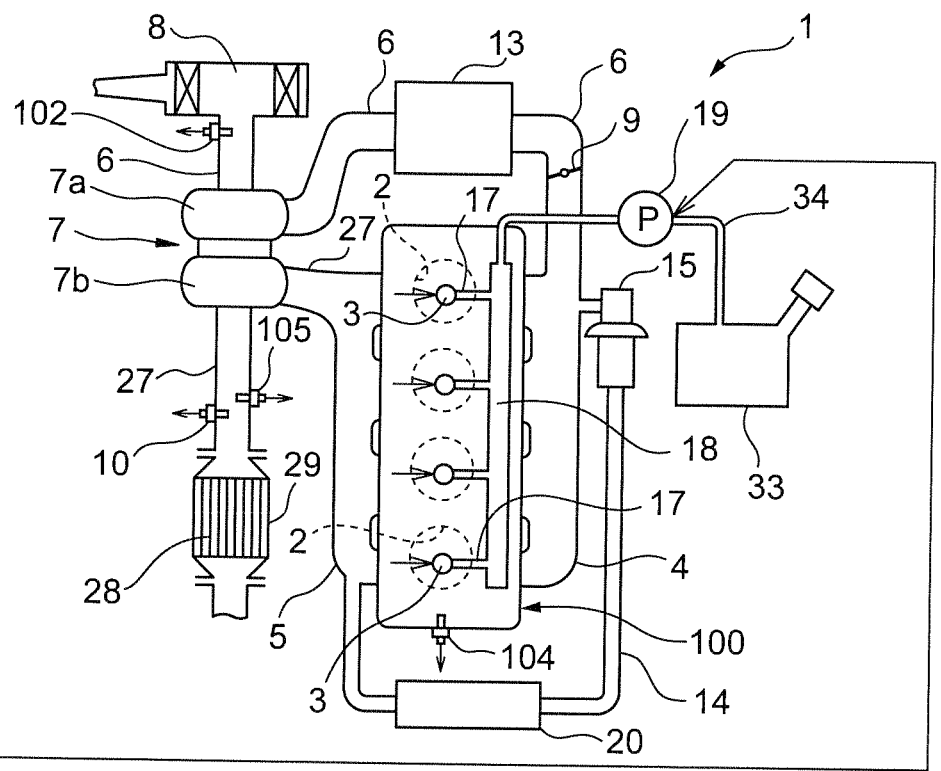
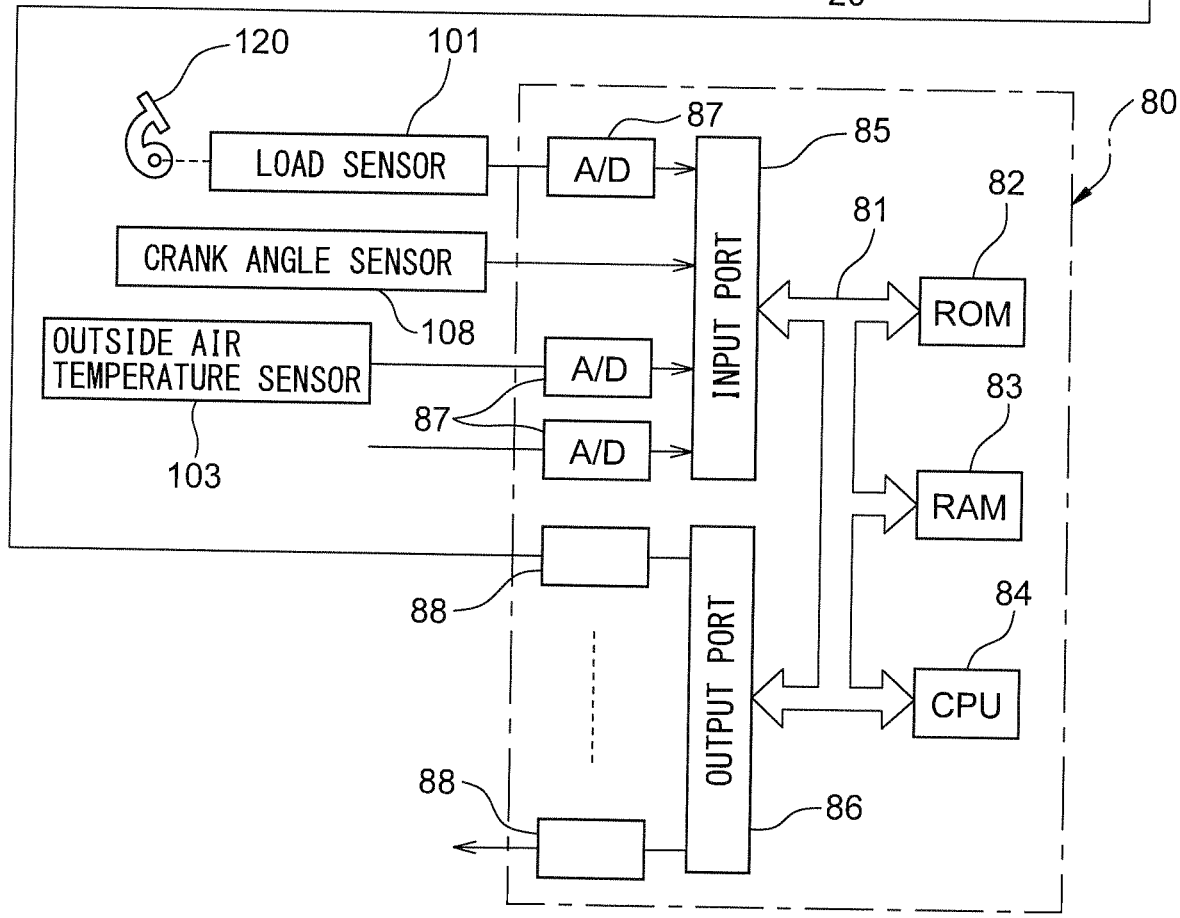

CONTROL SYSTEM OF EXHAUST SENSOR

TECHNICAL FIELD

The present invention relates to a control system of an exhaust sensor.

BACKGROUND ART

In the past, it is known to arrange an exhaust sensor in an exhaust passage of an internal combustion engine to detect a specific component in an exhaust gas (for example, see PLTs 1 to 3). This exhaust sensor is provided with an element body provided with an electrochemical cell, and a protective layer formed on the outer surface of the element body and comprised of a porous ceramic. The exhaust sensor is fastened to an exhaust pipe so as to be exposed to the exhaust gas. Part of the exhaust gas passes through the protective layer to flow into the element body. Further, the exhaust sensor is provided with a heater heating the element body so that the electrochemical cell becomes a predetermined operating temperature or more.

In this regard, when the temperature of the exhaust pipe is the dew point of water or less, the water vapor in the exhaust gas condenses and condensed water is produced. If there is condensed water in the exhaust passage, drops of condensed water strike the protective layer of the exhaust sensor together with the exhaust gas. If the protective layer does not have water repellency, the drops of water striking the protective layer penetrate the protective layer. If the temperature of the protective layer is high due to heating by the heater, the drops of water penetrating the protective layer evaporate inside the protective layer. As a result, thermal shock is given to the protective layer and element body and the element cracks.

Therefore, PLTs 1 and 2 describe to prevent cracking of the element of the exhaust sensor by utilizing the Leidenfrost phenomenon to impart water repellency to the protective layer of the exhaust sensor. The "Leidenfrost phenomenon" is the phenomenon wherein when drops of water strike a high temperature protective layer, a film of water vapor is formed between the protective layer and the drops of water whereby conduction of heat between the protective layer and drops of water is suppressed. If the Leidenfrost phenomenon occurs, the drops of water are repelled from the protective layer, so penetration of water to the protective layer is suppressed.

In the invention described in PLT 1, at the time of startup of the internal combustion engine, the Leidenfrost phenomenon is used so that the temperature of the sensor surface is held at an impact countering temperature higher than the operating temperature until the temperature around the exhaust sensor reaches the dew point so as to prevent cracking of the element.

CITATION LIST

Patent Literature

PLT 1: Japanese Patent Publication No. 2009-529691A
PLT 2: Japanese Patent Publication No. 2012-93330A
PLT 3: Japanese Patent Publication No. 2006-220026A

SUMMARY OF INVENTION

Technical Problem

However, even after the temperature around the exhaust sensor reaches the dew point, a part of the condensed water produced up to then can remain inside the exhaust passage until the temperature of the exhaust pipe reaches the boiling point of water. For this reason, in the control described in PLT 1, after the temperature of the sensor surface falls to the operating temperature, the element of the exhaust sensor is liable to crack due to being wetted by water. On the other hand, maintaining the sensor element at a high temperature for over a long period of time after startup of the internal combustion engine so as to reliably prevent cracking of the element of the exhaust sensor by the Leidenfrost phenomenon causes the power consumption of the heater to remarkably increase.

Therefore, an object of the present invention is to provide a control system of an exhaust sensor able to suppress an increase in the power consumption of a heater while preventing cracking of an element of the exhaust sensor due to being wetted by water.

Solution to Problem

In order to solve the above problem, in a first aspect, there is provided a control system of an exhaust sensor controlling an exhaust sensor arranged in an exhaust passage of an internal combustion engine and detecting a specific component in exhaust gas, wherein the exhaust sensor comprises an element body provided with an electrochemical cell, a protective layer formed on an outer surface of the element body and comprised of a porous ceramic, and a heater heating the element body and the protective layer, the control system comprises a heater control part setting a target temperature of the electrochemical cell and controlling the heater so that a temperature of the electrochemical cell becomes the target temperature, and a temperature estimating part estimating a temperature of an exhaust pipe around the exhaust sensor, the heater control part sets the target temperature to a first target temperature after startup of the internal combustion engine and until the estimated temperature of the exhaust pipe estimated by the temperature estimating part reaches a first exhaust pipe temperature, sets the target temperature to a second target temperature from when the estimated temperature of the exhaust pipe reaches the first exhaust pipe temperature to when it reaches a second exhaust pipe temperature, and sets the target temperature to an operating temperature of the electrochemical cell when the estimated temperature of the exhaust pipe reaches the second exhaust pipe temperature, and the first exhaust pipe temperature is a temperature of a dew point of water to less than a boiling point of water, the second exhaust pipe temperature is a temperature of the boiling point of water or more, the first target temperature is a temperature higher than the operating temperature, and the second target temperature is a temperature higher than the operating temperature and lower than the first target temperature.

In a second aspect, the temperature estimating part estimates or detects an outside air temperature of the internal combustion engine, and the heater control part sets the first target temperature higher when the temperature of the outside air temperature estimated or detected by the temperature estimating part at the time of startup of the internal combustion engine is relatively low compared with when the temperature of the outside air temperature is relatively high, in the first aspect.

In a third aspect, the temperature estimating part judges that the estimated temperature of the exhaust pipe has reached the first exhaust pipe temperature when an elapsed time from when the internal combustion engine is started up reaches a first elapsed time, and judges that the estimated temperature of the exhaust pipe has reached the second exhaust pipe temperature when the elapsed time reaches a second elapsed time longer than the first elapsed time and the temperature estimating part estimates or detects an outside air temperature of the internal combustion engine and sets the first elapsed time and the second elapsed time longer when the temperature of the outside air temperature estimated or detected at the time of startup of the internal combustion engine is relatively low compared with when the temperature of the outside air temperature is relatively high, in the first or second aspect.

In a fourth aspect, the temperature estimating part judges that the estimated temperature of the exhaust pipe has reached the first exhaust pipe temperature when a cumulative value of an intake air amount supplied to combustion chambers of the internal combustion engine from when the internal combustion engine is started up reaches a first cumulative air amount, and judges that the estimated temperature of the exhaust pipe has reached the second exhaust pipe temperature when the cumulative value reaches a second cumulative air amount greater than the first cumulative air amount and the temperature estimating part estimates or detects an outside air temperature of the internal combustion engine and sets the first cumulative air amount and the second cumulative air amount greater when the temperature of the outside air temperature estimated or detected at the time of startup of the internal combustion engine is relatively low compared with when the temperature of the outside air temperature is relatively high, in the first or second aspect.

In a fifth aspect, the exhaust sensor includes an upstream side exhaust sensor, and a downstream side exhaust sensor positioned at a downstream side of the upstream side exhaust sensor in a direction of exhaust flow, and the heater control part sets the first target temperature and the second target temperature at the downstream side exhaust sensor higher than the first target temperature and the second target temperature at the upstream side exhaust sensor, in any one of the first to fourth aspects.

In order to solve the above problem, in a sixth aspect, there is provided a control system of an exhaust sensor controlling an exhaust sensor arranged in an exhaust passage of an internal combustion engine and detecting a specific component in exhaust gas, wherein the exhaust sensor comprises an element body provided with an electrochemical cell, a protective layer formed on an outer surface of the element body and comprised of a porous ceramic, and a heater heating the element body and the protective layer, the control system comprises a heater control part setting a target temperature of the electrochemical cell and controlling the heater so that a temperature of the electrochemical cell becomes the target temperature, and a water quantity estimating part estimating an amount of condensed water in the exhaust passage upstream from the exhaust sensor in a direction of exhaust flow, and the heater control part sets the target temperature to a temperature of the operating temperature of the electrochemical cell or more based on the amount of condensed water estimated by the water quantity estimating part after startup of the internal combustion engine.

Advantageous Effects of Invention

According to the present invention, there is provided a control system of an exhaust sensor able to suppress an increase in the power consumption of a heater while preventing cracking of an element of the exhaust sensor due to being wetted by water.

BRIEF DESCRIPTION OF DRAWINGS

FIG. 1 is a view schematically showing an internal combustion engine in which a control system of an exhaust sensor according to a first embodiment of the present invention is used.

DESCRIPTION OF EMBODIMENTS

Figure 2:
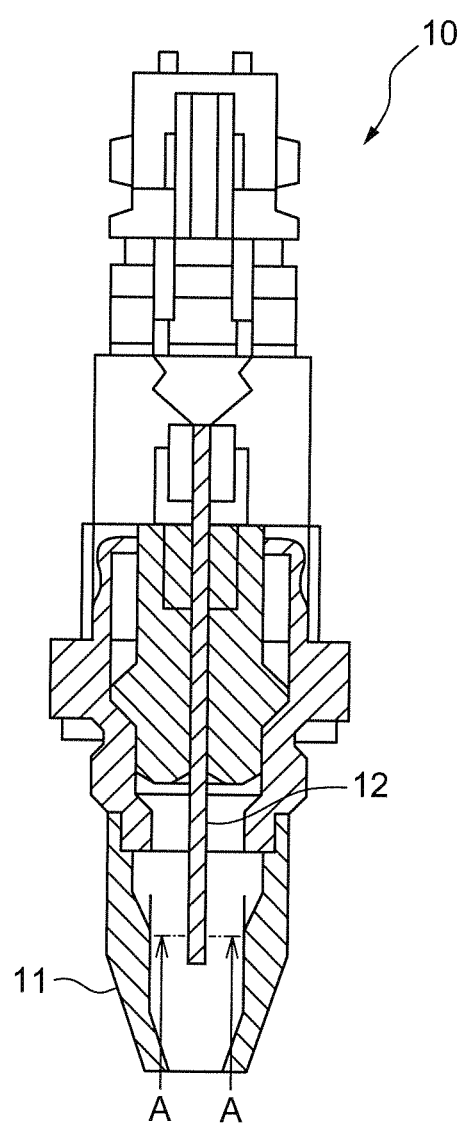
FIG. 2 is an enlarged view of an air-fuel ratio sensor.

Below, referring to the drawings, embodiments of the present invention will be explained in detail. Note that, in the following explanation, similar components are assigned the same reference notations.

First Embodiment

First, referring to FIG. 1 to FIG. 7, a first embodiment of the present invention will be explained.

<Explanation of Internal Combustion Engine as a Whole>

FIG. 1 is a view schematically showing an internal combustion engine 1 in which a control system of an exhaust sensor according to the first embodiment of the present invention is used. The internal combustion engine 1 shown in FIG. 1 is a compression self-ignition type internal combustion engine (diesel engine). The internal combustion engine 1 is for example mounted in a vehicle.

Referring to FIG. 1, the internal combustion engine 1 comprises an engine body 100, a combustion chamber 2 in each cylinder, an electronic control type fuel injector 3 injecting fuel into the combustion chamber 2, an intake manifold 4, and an exhaust manifold 5. The intake manifold 4 is connected with an outlet of a compressor 7a of a turbocharger (supercharger) 7 through an intake pipe 6. An inlet of the compressor 7a is connected through the intake pipe 6 to an air cleaner 8. Inside the intake pipe 6, a throttle valve 9 driven by a step motor is arranged. Furthermore, around the intake pipe 6, a cooling device 13 is arranged for cooling the intake air flowing through the inside of the intake pipe 6. In the internal combustion engine 1 shown in FIG. 1, the engine cooling water is guided to the inside of the cooling device 13 where the engine cooling water is used to cool the intake air. The intake manifold 4 and intake pipe 6 form an intake passage for guiding air into the combustion chambers 2.

On the other hand, the exhaust manifold 5 is connected through an exhaust pipe 27 to an inlet of the turbine 7b of the turbocharger 7. An outlet of the turbine 7b is connected through the exhaust pipe 27 to a casing 29 with a built-in exhaust purification catalyst 28. The exhaust manifold 5 and the exhaust pipe 27 form an exhaust passage for discharging exhaust gas produced by combustion of an air-fuel mixture in the combustion chambers 2. The exhaust purification catalyst 28 is, for example, a selective reduction type $NO_x$ reduction catalyst (SCR catalyst) or $NO_x$ storage/reduction catalyst for removing $NO_x$ in exhaust gas by reduction. Further, inside the exhaust passage, an oxidation catalyst, diesel particulate filter (DPF), etc. may be arranged for reducing the particulate matter (PM) in the exhaust gas.

The exhaust manifold 5 and the intake manifold 4 are connected with each other through an exhaust gas recirculation (below, referred to as "EGR") passage 14. Inside the EGR passage 14, an electronic control type EGR control valve 15 is arranged. Further, around the EGR passage 14, an EGR cooling device 20 is arranged for cooling the EGR gas flowing through the EGR passage 14. In the embodiment shown in FIG. 1, the engine cooling water is guided to the inside of the EGR cooling device 20 where the engine cooling water is used to cool the EGR gas.

The fuel is supplied by an electronic control type variable discharge fuel pump 19 from the fuel tank 33 through a fuel hose 34 to a common rail 18. The fuel supplied inside the common rail 18 is supplied through individual fuel feed lines 17 to the individual fuel injectors 3.

The internal combustion engine 1 is controlled in various ways by an electronic control unit (ECU) 80. The ECU 80 is comprised of a digital computer and is provided with components connected to each other by a bidirectional bus 81 such as a ROM (read only memory) 82, a RAM (random access memory) 83, a CPU (microprocessor) 84, an input port 85, and an output port 86. Outputs of a load sensor 101, an air flow meter 102, an outside air temperature sensor 103, and a water temperature sensor 104 are input through corresponding AD converters 87 to the input port 85. On the other hand, the output port 86 is connected through corresponding drive circuits 88 to the fuel injectors 3, the step motor for driving the throttle valve 9, the EGR control valve 15, and the fuel pump 19.

The load sensor 101 generates an output voltage proportional to the amount of depression of an accelerator 120. Therefore, the load sensor 101 detects the engine load. The air flow meter 102 is arranged in the intake passage between the air cleaner 8 and compressor 7a and detects the amount of air flowing through the inside of the intake pipe 6. The outside air temperature sensor 103 is, for example, arranged at the vehicle in which the internal combustion engine 1 is mounted, and detects the outside air temperature of the internal combustion engine 1. The water temperature sensor 104 is arranged in the cooling water path of the internal combustion engine 1 and detects the water temperature of the cooling water of the internal combustion engine 1.

Furthermore, at the input port 85, a crank angle sensor 108 which generates an output pulse every time the crankshaft is rotates by for example 15° is connected. The crank angle sensor 108 is used to detect the engine speed.

Note that, the internal combustion engine 1 may be a spark ignition type internal combustion engine in which spark plugs are arranged in the combustion chambers. Further, the specific configuration of the internal combustion engine 1 such as the cylinder array, the configuration of the intake and exhaust systems, and the presence of a supercharger may differ from the configurations shown in FIG. 1.

<Explanation of Air-Fuel Ratio Sensor>

In the present embodiment, as the exhaust sensor controlled by the control system of an exhaust sensor, an air-fuel ratio sensor 10 is arranged in the exhaust passage of the internal combustion engine 1. The air-fuel ratio sensor 10 detects a specific component in the exhaust gas flowing through the exhaust passage of the internal combustion engine 1. Specifically, the air-fuel ratio sensor 10 detects the concentration of oxygen in the exhaust gas so as to linearly detect the air-fuel ratio of the exhaust gas.

In the present embodiment, the air-fuel ratio sensor 10 is arranged in the exhaust passage at the upstream side of the exhaust purification catalyst 28 in the direction of exhaust flow. Note that, the air-fuel ratio sensor 10 may be arranged at another position of the exhaust passage, for example, at the downstream side of the exhaust purification catalyst 28 in the direction of exhaust flow.

Below, referring to FIG. 2 and FIG. 3, the configuration of the air-fuel ratio sensor 10 will be explained. FIG. 2 is an enlarged view of the air-fuel ratio sensor 10. In the FIG. 2, the front end side of the air-fuel ratio sensor 10 is shown by a cross-sectional view. The air-fuel ratio sensor 10 is fastened to an exhaust pipe 27 in the state with the front end 11 inserted into the exhaust pipe 27. The air-fuel ratio sensor 10 is provided inside it with a sensor element 12 having a plate-like shape.

Figure 3:
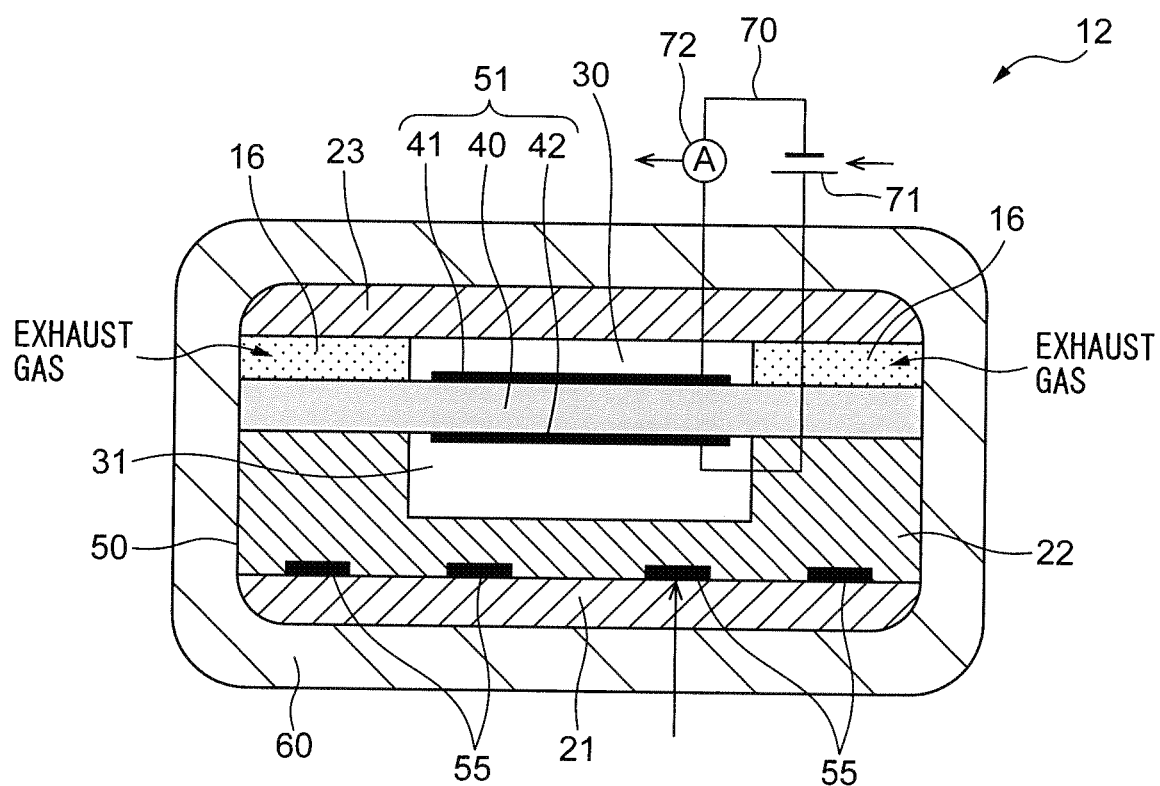
FIG. 3 is a cross-sectional view of a sensor element of an air-fuel ratio sensor along the line A-A of FIG. 2.

FIG. 3 is a cross-sectional view of the sensor element 12 of the air-fuel ratio sensor 10 along the line A-A of FIG. 2. As shown in FIG. 3, the sensor element 12 of the air-fuel ratio sensor 10 comprises an element body 50 provided with a sensor cell 51, and a protective layer 60 formed on an outside surface of the element body 50.

The element body 50 is provided with a measured gas chamber 30 and a reference gas chamber 31. When the air-fuel ratio sensor 10 is arranged in the exhaust passage of the internal combustion engine 1, exhaust gas flowing through the exhaust passage is introduced to the measured gas chamber 30 as measured gas. In the reference gas chamber 31, reference gas is introduced. The reference gas is for example air. In this case, the reference gas chamber 31 is opened to the atmosphere.

The air-fuel ratio sensor 10 is a multilayer type air-fuel ratio sensor comprised of a plurality of layers stacked together. The element body 50 is provided with a solid electrolyte layer 40, diffusion regulating layer 16, first impermeable layer 21, second impermeable layer 22, and third impermeable layer 23. The solid electrolyte layer 40 is a sheet member having an oxide ion conductivity. The solid electrolyte layer 40 is, for example, a sintered body of $ZrO_2$ (zirconia), $HfO_2$, $ThO_2$, $Bi_2O_3$, etc. to which CaO, MgO, $Y_2O_3$, $Yb_2O_3$, etc. is added as a stabilizer. The diffusion regulating layer 16 is a sheet member having gas permeability. The diffusion regulating layer 16, for example, is comprised of alumina, magnesia, silica, spinel, mullite, or another porous ceramic. The impermeable layers 21 to 23 are gas barrier sheet members and, for example, contain alumina.

The layers of the element body 50 comprise, from the bottom in FIG. 3, the first impermeable layer 21, second impermeable layer 22, solid electrolyte layer 40, diffusion regulating layer 16, and third impermeable layer 23 in that order. The measured gas chamber 30 is formed and defined by the solid electrolyte layer 40, diffusion regulating layer 16, and third impermeable layer 23. The exhaust gas passes through the protective layer 60 and diffusion regulating layer 16 and is introduced into the measured gas chamber 30. The diffusion regulating layer 16 regulates the speed of diffusion of the measured gas. Note that, the measured gas chamber 30 can be configured in any way so long as being configured so as to adjoin the solid electrolyte layer 40 and to have measured gas introduced into it.

The reference gas chamber 31 is formed and defined by the solid electrolyte layer 40 and the second impermeable layer 22. Note that, the reference gas chamber 31 may be configured in any way so long as being configured so as to adjoin the solid electrolyte layer 40 and to have reference gas flow into it.

The sensor cell 51 is an electrochemical cell having a solid electrolyte layer 40, first electrode 41, and second electrode 42. The first electrode 41 is arranged on the surface of the measured gas chamber 30 side of the solid electrolyte layer 40 so as to be exposed to the measured gas in the measured gas chamber 30. On the other hand, the second electrode 42 is arranged on the surface of the reference gas chamber 31 side of the solid electrolyte layer 40 so as to be exposed to the reference gas inside the reference gas chamber 31. The first electrode 41 and the second electrode 42 are arranged so as to face each other across the solid electrolyte layer 40. The first electrode 41 and the second electrode 42 are comprised of platinum (Pt) or another precious metal with a high catalytic activity. For example, the first electrode 41 and the second electrode 42 are porous cermet electrodes containing mainly Pt.

The protective layer 60 is formed on the outside surface of the element body 50 so as to cover the entire outside surface of the element body 50. The protective layer 60 has gas permeability and is comprised of alumina, titania, zirconia, silicon carbide, silicon nitride, zinc oxide, or another porous ceramic.

The sensor element 12 is further provided with a heater 55. In the present embodiment, the heater 55, as shown in FIG. 3, is arranged between the first impermeable layer 21 and the second impermeable layer 22. The heater 55 is, for example, a sheet of cermet including platinum (Pt) and a ceramic (for example, alumina etc.) forming a heating element which generates heat by carrying a current. The heater 55 heats the element body 50 and the protective layer 60.

An electrical circuit 70 is connected with the first electrode 41 and the second electrode 42 of the sensor cell 51. The electrical circuit 70 is provided with a power supply 71 and a current detector 72. The power supply 71 supplies voltage across the electrodes so that the potential of the second electrode 42 becomes higher than the potential of the first electrode 41. The output port 86 of the ECU 80 is connected through a corresponding drive circuit 88 to the power supply 71. Therefore, the ECU 80 can control the power supply 71 and control the voltage supplied to the sensor cell 51. Further, the current detector 72 detects the current flowing through the sensor cell 51 as the output of the sensor cell 51. The output of the current detector 72 is input through the corresponding AD converter 87 to the input port 85 of the ECU 80. Therefore, the ECU 80 can acquire the output of the sensor cell 51 detected by the current detector 72 from the current detector 72.

The air-fuel ratio sensor 10 detects the limit current flowing at the sensor cell 51 when supplying a predetermined voltage to the sensor cell 51 to thereby detect the air-fuel ratio of the exhaust gas. Therefore, the air-fuel ratio sensor 10 in the present embodiment is a so-called limit current type air-fuel ratio sensor.

<Leidenfrost Phenomenon>

In this regard, when the temperature of the exhaust pipe 27 is the dew point of water or less, the water vapor in the exhaust gas is condensed and condensed water is formed. If the exhaust passage contains condensed water, the drops of the condensed water strike the protective layer 60 of the air-fuel ratio sensor 10 together with the exhaust gas. If the protective layer 60 does not have water repellency, the drops of water striking the protective layer 60 penetrate the protective layer 60. When heating by the heater 55 so that the temperature of the protective layer 60 becomes high, the drops of water penetrating the protective layer 60 evaporate inside the protective layer 60. As a result, thermal shock is given to the protective layer 60 and element body 50, and thus the element of the sensor element 12 sometimes cracks.

The protective layer 60 has water repellency when the temperature is high. This characteristic is obtained by causing the Leidenfrost phenomenon. The "Leidenfrost phenomenon" is the phenomenon wherein when drops of water strike a high temperature protective layer, a film of water vapor is formed between the protective layer and the drops of water whereby conduction of heat between the protective layer and drops of water is suppressed. If the Leidenfrost phenomenon occurs, the drops of water are repelled from the protective layer 60, so penetration of water to the protective layer 60 is suppressed.

The temperature at which the Leidenfrost phenomenon occurs is generally said to be determined by the type of liquid which strikes an object. However, the inventors of the present application newly discovered that with an object with a low heat capacity such as the protective layer 60 of the air-fuel ratio sensor 10, the temperature at which the Leidenfrost phenomenon occurs changes in accordance with the amount of liquid.

Figure 4:
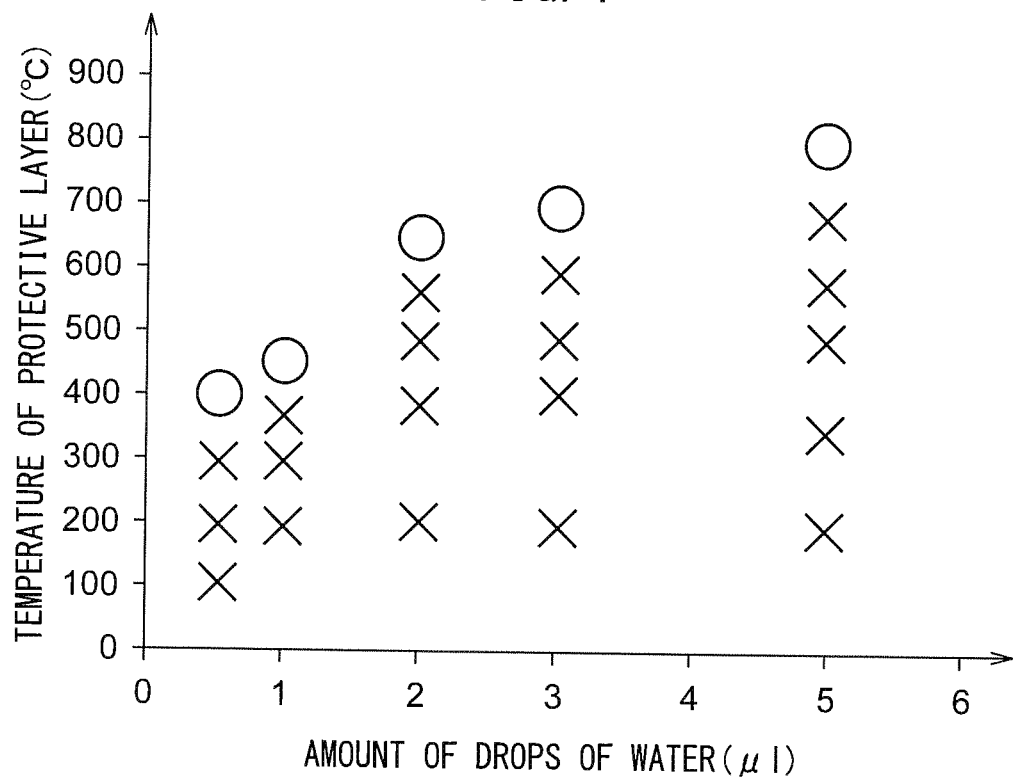
FIG. 4 is a graph showing the occurrence of the Leidenfrost phenomenon when changing the amount of drops of water striking a protective layer and a temperature of a protective layer.
Figure 5:
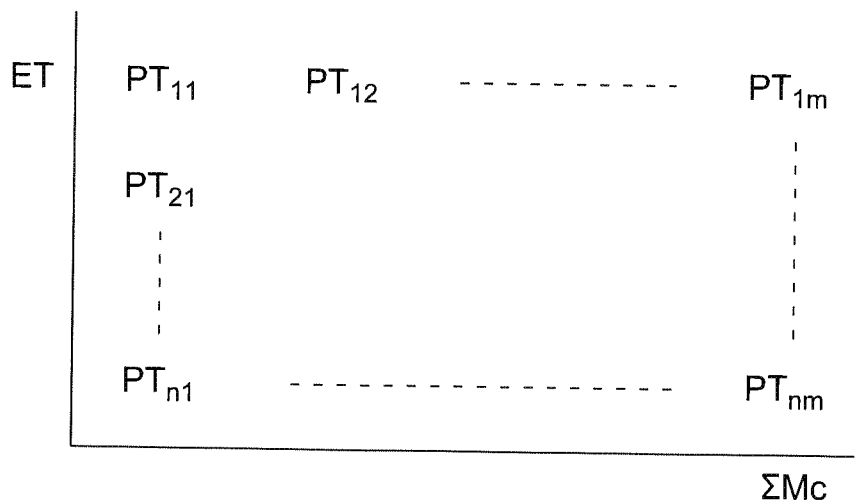
FIG. 5 is a graph showing a relationship between an elapsed time and cumulative air amount, and the temperature of the exhaust pipe.

FIG. 4 is a graph showing the occurrence of the Leidenfrost phenomenon when the amount of drops of water striking the protective layer 60 and the temperature of the protective layer 60 change. The X marks in the figure show when no Leidenfrost phenomenon occurs. On the other hand, the 0 marks in the figure show when the Leidenfrost phenomenon occurs. As will be understood from FIG. 4, the temperature at which the Leidenfrost phenomenon occurs changes according to the amount of drops of water. Specifically, the temperature at which the Leidenfrost phenomenon occurs becomes higher the greater the amount of drops of water. The reason is believed to be with a protective layer 60 with a small heat capacity, at the time of formation of the film of water vapor, the temperature of the protective layer 60 falls and the amount of fall of the temperature of the protective layer 60 is proportional to the amount of drops of water.

<Explanation of Control System of Exhaust Sensor>

The control system of an exhaust sensor according to the present embodiment performs the following control when starting up the internal combustion engine 1 based on the above-mentioned new discovery so as to prevent cracking of the element of the exhaust sensor (in the present embodiment, the air-fuel ratio sensor 10).

The control system of an exhaust sensor according to the present embodiment is provided with a heater control part and a temperature estimating part. The heater control part sets the target temperature of the sensor cell 51 and controls the heater 55 so that the temperature of the sensor cell 51 becomes the target temperature. For example, the heater control part calculates the temperature of the sensor cell 51 based on the impedance of the sensor cell 51 and controls the voltage supplied to the heater 55 by feedback so that the calculated temperature becomes the target temperature. When the heater 55 is used to heat the sensor cell 51, the protective layer 60 is similarly heated by the heater 55. For this reason, the temperature of the protective layer 60 is correlated with the temperature of the sensor cell 51. Therefore, the above-mentioned feedback control may be used to control not only the temperature of the sensor cell 51, but also the temperature of the protective layer 60. In the present embodiment, a part of the ECU 80 functions as the heater control part.

The temperature estimating part estimates the temperature of the exhaust pipe 27 around the air-fuel ratio sensor 10 (below, simply referred to as "the temperature of the exhaust pipe 27"). For example, the temperature estimating part estimates the temperature of the exhaust pipe 27 from the output of the exhaust temperature sensor 105 arranged in the exhaust passage near the air-fuel ratio sensor 10. In the present embodiment, as shown in FIG. 1, the exhaust temperature sensor 105 is arranged in the exhaust passage between the turbine 7b and the exhaust purification catalyst 28 and detects the temperature of the exhaust pipe 27. The output of the exhaust temperature sensor 105 is input through the corresponding AD converter 87 to the input port 85 of the ECU 80.

Note that, the temperature estimating part may estimate the temperature of the exhaust pipe 27 without using the exhaust temperature sensor 105. In this case, in the internal combustion engine 1, an exhaust temperature sensor 105 does not have to be provided near the air-fuel ratio sensor 10. For example, the temperature estimating part may estimate the temperature of the exhaust pipe 27 based on the elapsed time from when the internal combustion engine 1 is started up. In this case, the longer the elapsed time from when the internal combustion engine 1 is started up, the higher the temperature of the exhaust pipe 27 estimated by the temperature estimating part. Further, the temperature estimating part may estimate the temperature of the exhaust pipe 27 based on the cumulative value of the amount of intake air supplied to the combustion chambers 2 from when the internal combustion engine 1 is started up (below, referred to as the "cumulative air amount"). The cumulative air amount is for example calculated based on the output of the air flow meter 102. In this case, the greater the cumulative air amount, the higher the temperature of the exhaust pipe 27 estimated by the temperature estimating part. Further, the temperature estimating part may estimate the temperature of the exhaust pipe 27 based on the elapsed time and the cumulative air amount from when the internal combustion engine 1 is started up. In this case, the temperature estimating part uses the map such as shown, for example, in FIG. 5 to estimate the temperature of the exhaust pipe 27. In this map, the temperature PT of the exhaust pipe 27 is shown as a function of the elapsed time ET and the cumulative air amount ΣMc. In the present embodiment, a part of the ECU 80 functions as the temperature estimating part.

The heater control part sets the target temperature of the sensor cell 51 to the first target temperature after the startup of the internal combustion engine 1 and until the estimated temperature of the exhaust pipe 27 estimated by the temperature estimating part reaches the first exhaust pipe temperature so that the Leidenfrost phenomenon occurs at the surface of the protective layer 60. The first exhaust pipe temperature is a temperature of the dew point of water to less than the boiling point of water. The dew point of water is 54° C. at atmospheric pressure (1 atm), while the boiling point of water is 100° C. at atmospheric pressure (1 atm). Further, the first target temperature is a temperature higher than the operating temperature of the sensor cell 51. The operating temperature of the sensor cell 51 is the activation temperature of the sensor cell 51 or more, for example, 600° C. to 650° C.

The heater control part sets the target temperature of the sensor cell 51 to the second target temperature from when the estimated temperature of the exhaust pipe 27 reaches the first exhaust pipe temperature to when it reaches the second exhaust pipe temperature so that the Leidenfrost phenomenon occurs at the surface of the protective layer 60. Further, the heater control part sets the target temperature of the sensor cell 51 at the operating temperature of the sensor cell 51 when the estimated temperature of the exhaust pipe 27 reaches the second exhaust pipe temperature. The second exhaust pipe temperature is a temperature of the boiling point of water or more. Further, the second target temperature is a temperature higher than the operating temperature of the sensor cell 51 and lower than the first target temperature.

<Explanation of Control Using Time Chart>

Figure 6:
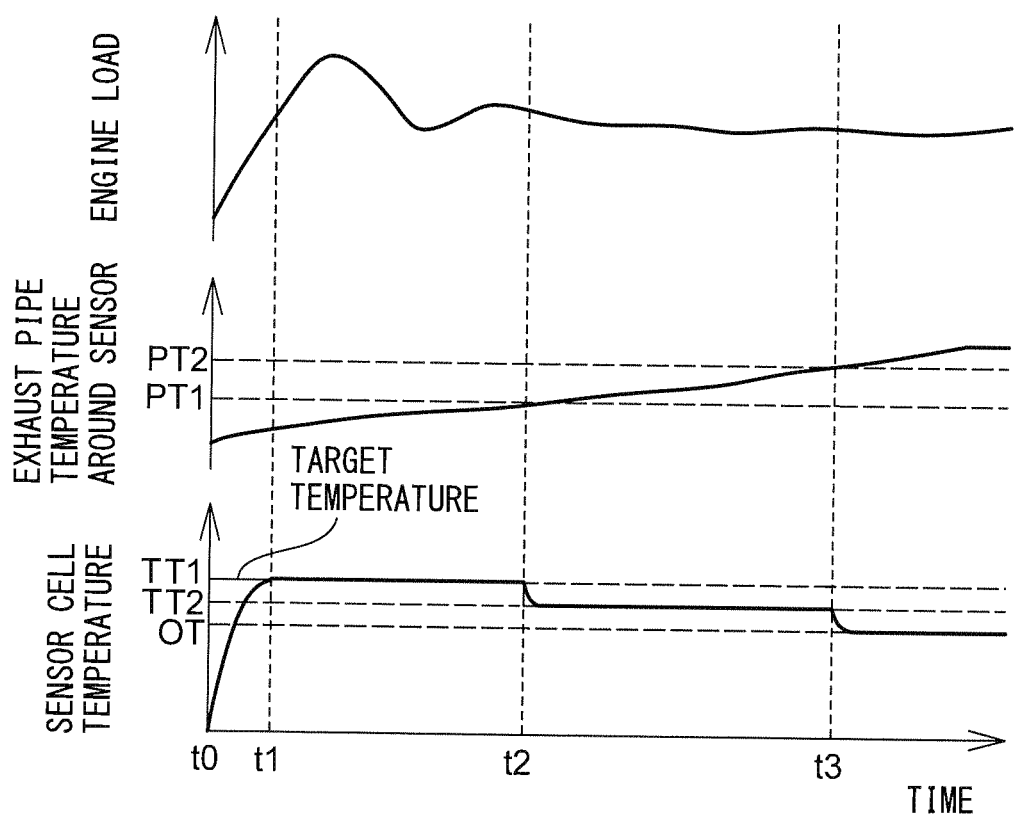
FIG. 6 is a schematic time chart of an engine load etc. when making an internal combustion engine start up.

Below, referring to the time chart of FIG. 6, the control when making the internal combustion engine 1 start up will be specifically explained. FIG. 6 is a schematic time chart of the engine load, the temperature of the exhaust pipe 27, and the temperature of the sensor cell 51 when making the internal combustion engine 1 start up. In the graph of the temperature of the sensor cell 51, the target temperature of the sensor cell 51 is shown by the fine line. In the illustrated example, the temperature of the exhaust pipe 27 is calculated from the output of the exhaust temperature sensor 105. Further, the temperature of the sensor cell 51 is calculated based on the impedance of the sensor cell 51.

In the illustrated example, at the time t0, the internal combustion engine 1 is started. When the internal combustion engine 1 is started, the target temperature of the sensor cell 51 is set to the first target temperature TT1. As a result, after the time t0, due to heating by the heater 55, the temperature of the sensor cell 51 rises toward the first target temperature TT1. The first target temperature TT1 is for example a temperature of 750° C. or more. At the time t1, the temperature of the sensor cell 51 reaches the first target temperature TT1. After the time t1, the temperature of the sensor cell 51 is maintained at the first target temperature TT1.

At the time t2, the temperature of the exhaust pipe 27 reaches the first exhaust pipe temperature PT1. The first exhaust pipe temperature PT1 is for example the dew point of water (54° C.). At the time t2, the target temperature of the sensor cell 51 is switched from the first target temperature TT1 to the second target temperature TT2. As a result, after the time t2, the temperature of the sensor cell 51 falls toward the second target temperature TT2. The second target temperature TT2 is a temperature lower than the first target temperature TT1, for example, is a temperature of 650° C. to 700° C. The temperature of the sensor cell 51 reaches the second target temperature TT2, then is maintained at the second target temperature TT2.

At the time t3, the temperature of the exhaust pipe 27 reaches the second exhaust pipe temperature PT2. The second exhaust pipe temperature PT2 is for example the boiling point of water (100° C.). At the time t3, the target temperature of the sensor cell 51 is switched from the second target temperature TT2 to the operating temperature OT of the sensor cell 51. As a result, after the time t3, the temperature of the sensor cell 51 falls toward the operating temperature OT. The operating temperature OT is a temperature lower than the second target temperature, for example, is a temperature of 600° C. to 650° C. The temperature of the sensor cell 51 reaches the operating temperature OT, then is maintained at the operating temperature OT.

If the temperature of the exhaust pipe 27 becomes the dew point of water or more, inside the exhaust pipe 27, new condensed water is not formed from the exhaust gas. However, even after the temperature of the exhaust pipe 27 reaches the dew point of water, part of the condensed water generated up to now can remain inside the exhaust pipe 27 until the temperature of the exhaust pipe 27 reaches the boiling point of water. For this reason, at the time t2 when the temperature of the exhaust pipe 27 reaches the dew point of water, if setting the target temperature of the sensor cell 51 at the operating temperature OT, the element of the air-fuel ratio sensor 10 may crack by being wetted by water. On the other hand, to reliably prevent the element of the air-fuel ratio sensor 10 from cracking, at the time t2 and on as well, if maintaining the target temperature of the sensor cell 51 at the first target temperature TT1, the power consumption of the heater 55 remarkably increases and deterioration of fuel consumption of the internal combustion engine 1 is caused.

If the temperature of the exhaust pipe 27 becomes the dew point of water or more, part of the condensed water inside the exhaust pipe 27 is vaporized. Further, the condensed water in the exhaust pipe 27 is flushed by the exhaust gas to the downstream side in the direction of exhaust flow. For this reason, in the illustrated example, the amount of water striking the protective layer 60 of the air-fuel ratio sensor 10 after the time t2 when the temperature of the exhaust pipe 27 reaches the dew point of water decreases. As a result, as will be understood from FIG. 4, in the protective layer 60, the temperature at which the Leidenfrost phenomenon occurs falls. For this reason, at the time t2, it is possible to maintain the water repellency of the sensor element 12 while causing a drop in the target temperature of the sensor cell 51 from the first target temperature TT1 to the second target temperature TT2. Due to this, in the present embodiment, it is possible to suppress an increase in the power consumption of the heater 55 while preventing cracking of the element of the air-fuel ratio sensor 10 due to being wetted by water.

<Processing for Setting Target Temperature>

Figure 7:
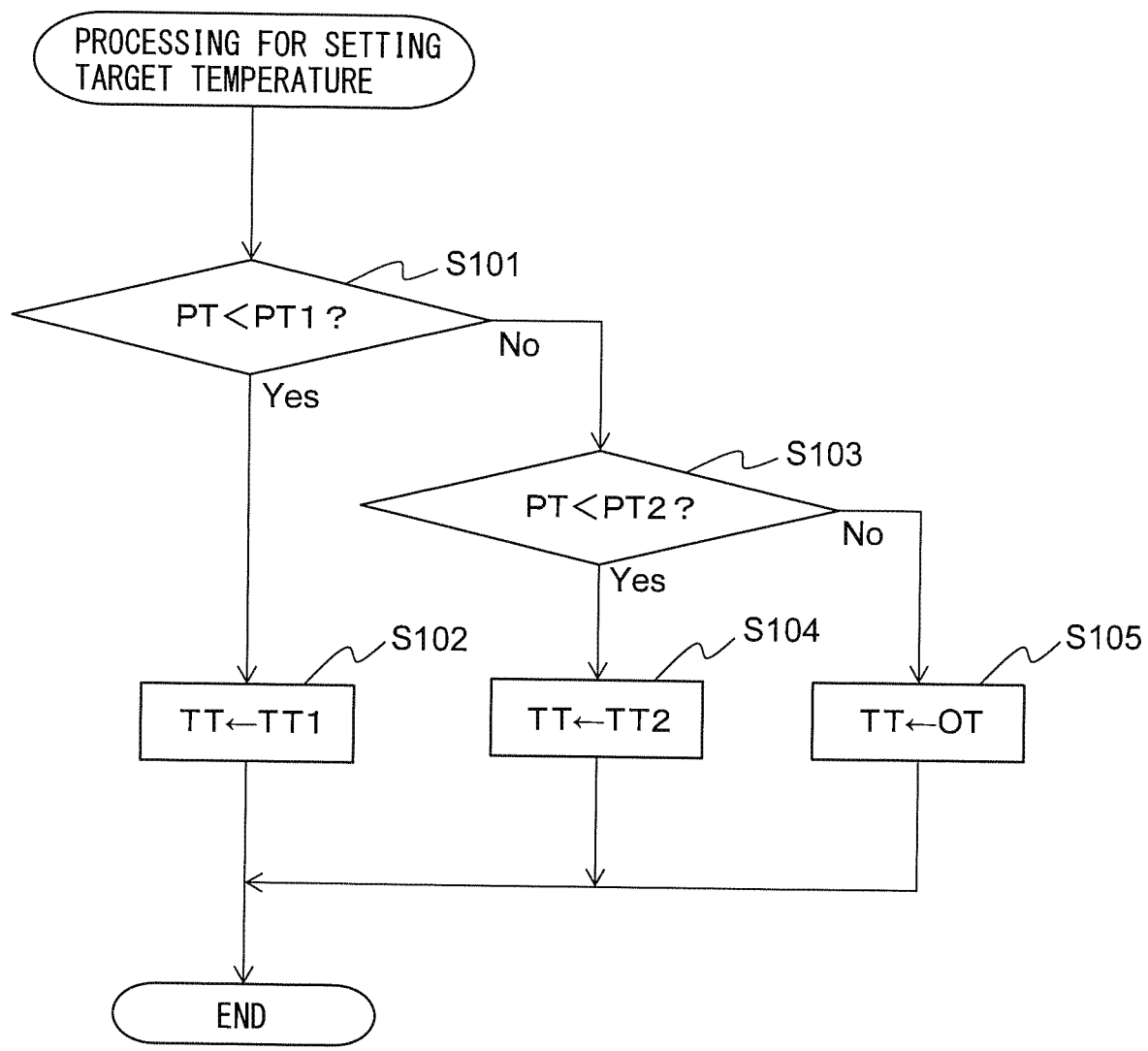
FIG. 7 is a flow chart showing a control routine of processing for setting a target temperature in the first embodiment of the present invention.

Below, the flow chart of FIG. 7 will be referred to so as to explain control for setting the target temperature of the sensor cell 51. FIG. 7 is a flow chart showing a control routine for processing for setting a target temperature in the first embodiment of the present invention. The present control routine is performed after startup of the internal combustion engine 1 by the ECU 80 repeatedly at predetermined time intervals.

First, at step S101, the temperature estimating part judges whether the temperature PT of the exhaust pipe 27 is lower than the first exhaust pipe temperature PT1. The temperature PT of the exhaust pipe 27 is estimated by temperature estimating part by using any of the above methods. The first exhaust pipe temperature PT1 is a temperature of the dew point of water to less than the boiling point of water, for example, the dew point of water.

If, at step S101, it is judged that the temperature PT of the exhaust pipe 27 is lower than the first exhaust pipe temperature PT1, the present control routine proceeds to step S102. At step S102, the heater control part sets the target temperature TT of the sensor cell 51 to the first target temperature TT1. The first target temperature TT1 is a temperature higher than the operating temperature OT of the sensor cell 51, for example, a temperature of 750° C. or more. After step S102, the present control routine ends.

On the other hand, if at step S101 it is judged that the temperature PT of the exhaust pipe 27 is the first exhaust pipe temperature PT1 or more, the present control routine proceeds to step S103. At step S103, the temperature estimating part judges whether the temperature PT of the exhaust pipe 27 is lower than the second exhaust pipe temperature PT2. The second exhaust pipe temperature PT2 is a temperature of the boiling point of water or more, for example, the boiling point of water.

If at step S103 it is judged that the temperature PT of the exhaust pipe 27 is lower than the second exhaust pipe temperature PT2, the present control routine proceeds to step S104. At step S104, the heater control part sets the target temperature TT to the second target temperature TT2. The second target temperature TT2 is a temperature higher than the operating temperature OT of the sensor cell 51 and lower than the first target temperature TT1, for example, is a temperature of 650° C. to 700° C. After step S104, the present control routine is ended.

On the other hand, if at step S103 it is judged that the temperature PT of the exhaust pipe 27 is the second exhaust pipe temperature PT2 or more, the present control routine proceeds to step S105. At step S105, the heater control part sets the target temperature TT at the operating temperature OT. The operating temperature OT is a temperature of the activation temperature of the sensor cell 51 or more, for example, is a temperature of 600° C. to 650° C. After step S105, the present control routine is ended.

Second Embodiment

The configuration and the control of the control system of an exhaust sensor according to the second embodiment are basically similar to the configuration and the control of the control system of an exhaust sensor according to the first embodiment except for the points explained below. For this reason, below, the second embodiment of the present invention will be explained focusing on the parts different from the first embodiment.

In the second embodiment, the temperature estimating part estimates or detects not only the temperature of the exhaust pipe 27, but also the outside air temperature of the internal combustion engine 1. For example, the temperature estimating part estimates the outside air temperature from the output of the water temperature sensor 104 or detects the outside air temperature by the outside air temperature sensor 103.

The heater control part sets the first target temperature higher when the outside air temperature estimated or detected by the temperature estimating part at the time of startup of the internal combustion engine 1 (below, referred to as the "startup outside air temperature") is relatively low compared with when the startup outside air temperature is relatively high. In other words, the heater control part raises the first target temperature in stages (in steps) or linearly as the startup outside air temperature becomes higher.

For this reason, in the second embodiment, at step S102 of FIG. 7, the heater control part acquires the startup outside air temperature from the temperature estimating part and sets the target temperature TT of the sensor cell 51 based on the startup outside air temperature. Specifically, the heater control part sets the first target temperature TT1 higher when the startup outside air temperature is relatively low compared with when the startup outside air temperature is relatively high. Note that, in this case as well, the first target temperature TT1 is set at a temperature higher than the second target temperature TT2 and the operating temperature OT of the sensor cell 51.

If the startup outside air temperature is low, it is expected that the amount of condensed water generated right after startup of the internal combustion engine 1 becomes greater and the amount of water which the sensor element 12 is wetted by becomes greater. As opposed to this, in the second embodiment, by setting the target temperature of the sensor cell 51 relatively high when the startup outside air temperature is relatively low, it is possible to reliably prevent cracking of the element of the air-fuel ratio sensor 10 due to being wetted by water. On the other hand, if the startup outside air temperature is high, it is expected that the amount of condensed water produced right after the startup of the internal combustion engine 1 becomes smaller and the amount of water which the sensor element 12 is wetted by becomes smaller. As opposed to this, in the second embodiment, by setting the target temperature of the sensor cell 51 relatively low when the startup outside air temperature is relatively high, it is possible to prevent cracking of the element of the air-fuel ratio sensor 10 due to being wetted by water while suppressing an increase in the power consumption of the heater 55.

Third Embodiment

The configuration and the control of the control system of an exhaust sensor according to the third embodiment are basically similar to the configuration and the control of the control system of an exhaust sensor according to the first embodiment except for the points explained below. For this reason, below, the third embodiment of the present invention will be explained focusing on the parts different from the first embodiment.

In the third embodiment, the temperature estimating part estimates that the estimated temperature of the exhaust pipe 27 has reached the first exhaust pipe temperature when the elapsed time from when the internal combustion engine 1 was started up reaches the first elapsed time, and estimates that the estimated temperature of the exhaust pipe 27 has reached the second exhaust pipe temperature when the elapsed time from when the internal combustion engine 1 was started up reaches the second elapsed time. The second elapsed time is longer than the first elapsed time. The temperature estimating part, like in the second embodiment, estimates or detects not only the temperature of the exhaust pipe 27, but also the outside air temperature of the internal combustion engine 1. The temperature estimating part sets the first elapsed time and the second elapsed time longer when the startup outside air temperature is relatively low compared with when the startup outside air temperature is relatively high. Due to this, it is possible to precisely estimate the temperature of the exhaust pipe 27 and in turn possible to suitably set the target temperature of the sensor cell 51.

<Processing for Setting Target Temperature>

Figure 8:
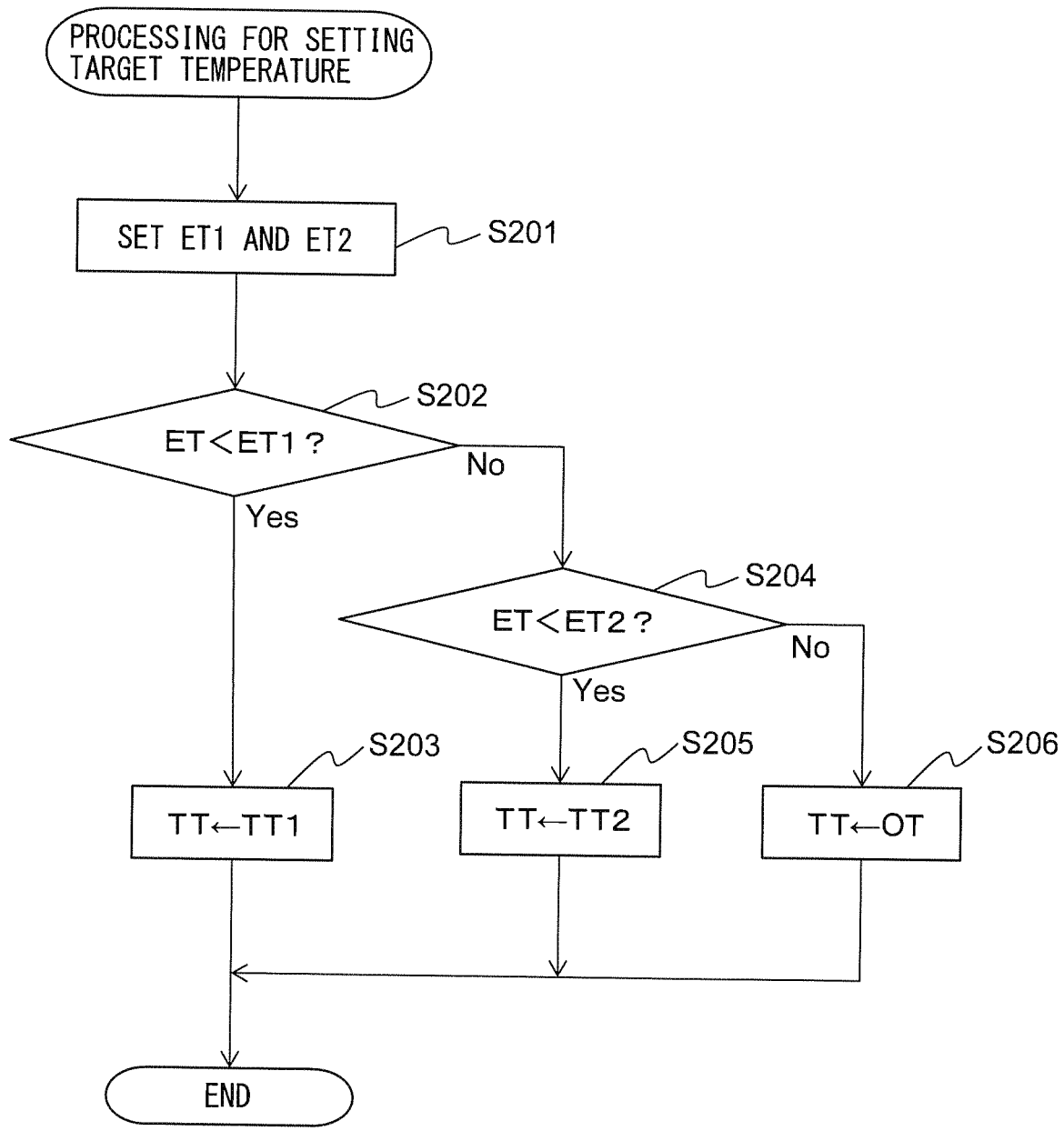
FIG. 8 is a flow chart showing a control routine of processing for setting a target temperature in a third embodiment of the present invention.

FIG. 8 is a flow chart showing a control routine for processing for setting a target temperature in the third embodiment of the present invention. The present control routine is performed after startup of the internal combustion engine 1 by the ECU 80 repeatedly at predetermined time intervals.

First, at step S201, the temperature estimating part sets the first elapsed time ET1 and the second elapsed time ET2 based on the startup outside air temperature. Specifically, the temperature estimating part sets the first elapsed time ET1 and the second elapsed time ET2 longer when the startup outside air temperature is relatively low compared to when the startup outside air temperature is relatively high. For example, the temperature estimating part sets the first elapsed time ET1 and the second elapsed time ET2 longer the lower the startup outside air temperature.

Next, at step S202, the temperature estimating part judges whether the elapsed time ET from when the internal combustion engine 1 started up is shorter than the first elapsed time ET1. If it is judged that the elapsed time ET is shorter than the first elapsed time ET1, the present control routine proceeds to step S203. In this case, it is estimated that the estimated temperature of the exhaust pipe 27 is less than the first exhaust pipe temperature, so at step S203, the heater control part sets the target temperature TT of the sensor cell 51 to the first target temperature TT1. The first target temperature TT1 is a temperature higher than the operating temperature OT of the sensor cell 51, for example, a temperature of 750° C. or more. After step S203, the present control routine is ended.

On the other hand, if, at step S202, it is judged that the elapsed time ET is the first elapsed time ET1 or more, the present control routine proceeds to step S204. At step S204, the temperature estimating part judges whether the elapsed time ET is shorter than the second elapsed time ET2. If it is judged that the elapsed time ET is shorter than the second elapsed time ET2, the present control routine proceeds to step S205. In this case, it is estimated that the estimated temperature of the exhaust pipe 27 is the first exhaust pipe temperature to less than the second exhaust pipe temperature, so at step S205, the heater control part sets the target temperature TT of the sensor cell 51 to the second target temperature TT2. The second target temperature TT2 is a temperature higher than the operating temperature OT of the sensor cell 51 and lower than the first target temperature TT1, for example, is a temperature of 650° C. to 700° C. After step S205, the present control routine is ended.

On the other hand, if at step S204 it is judged that the elapsed time ET is the second elapsed time ET2 or more, the present control routine proceeds to step S206. In this case, it is estimated that the estimated temperature of the exhaust pipe 27 is the second exhaust pipe temperature or more, so at step S206, the heater control part sets the target temperature TT to the operating temperature OT. The operating temperature OT is a temperature of the activation temperature of the sensor cell 51 or more, for example, is a temperature of 600° C. to 650° C. After step S206, the present control routine is ended. Note that, the elapsed time ET is reset to zero when the internal combustion engine 1 is stopped.

Fourth Embodiment

The configuration and the control of the control system of an exhaust sensor according to the fourth embodiment are basically similar to the configuration and the control of the control system of an exhaust sensor according to the first embodiment except for the points explained below. For this reason, below, the fourth embodiment of the present invention will be explained focusing on the parts different from the first embodiment.

At the fourth embodiment, the temperature estimating part estimates that the estimated temperature of the exhaust pipe 27 has reached the first exhaust pipe temperature when the cumulative air amount reaches the first cumulative air amount, and estimates that the estimated temperature of the exhaust pipe 27 has reached the second exhaust pipe temperature when the cumulative air amount reaches the second cumulative air amount. The second cumulative air amount is larger than the first cumulative air amount. The temperature estimating part, in the same way as the second embodiment, estimates or detects not only the temperature of the exhaust pipe 27, but also the outside air temperature of the internal combustion engine 1. The temperature estimating part sets the first cumulative air amount and the second cumulative air amount larger when the startup outside air temperature is relatively low compared to when the startup outside air temperature is relatively high. For example, the temperature estimating part sets the first cumulative air amount and the second cumulative air amount larger the lower the startup outside air temperature. This enables the temperature of the exhaust pipe 27 to be precisely estimated and in turn enables the target temperature of the sensor cell 51 to be suitably set.

<Processing for Setting Target Temperature>

Figure 9:
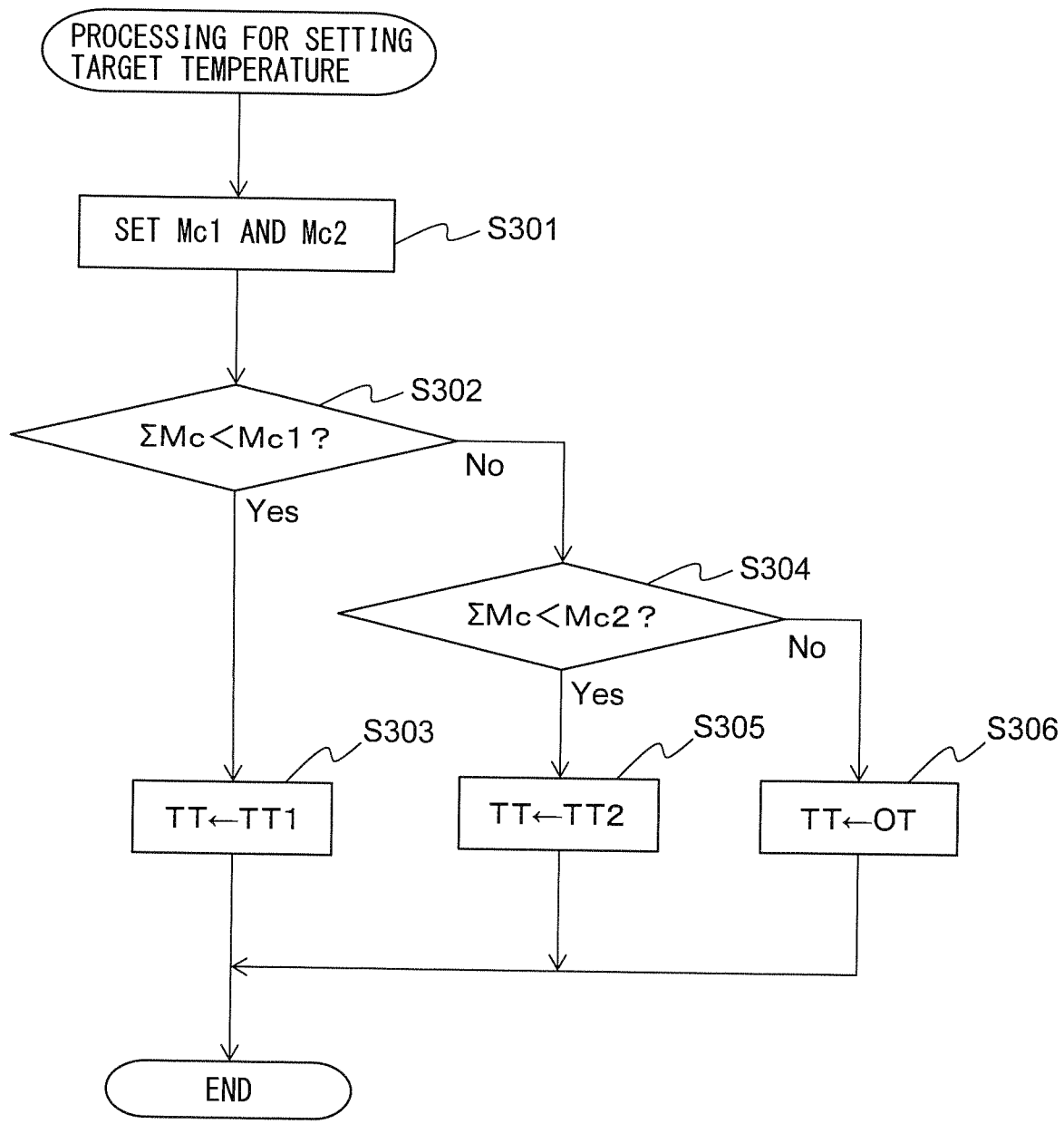
FIG. 9 is a flow chart showing a control routine of processing for setting a target temperature in a fourth embodiment of the present invention.

FIG. 9 is a flow chart showing the control routine for processing for setting the target temperature in the fourth embodiment of the present invention. The present control routine is performed after startup of the internal combustion engine 1 by the ECU 80 repeatedly at predetermined time intervals.

First, at step S301, the temperature estimating part sets the first cumulative air amount Mc1 and the second cumulative air amount Mc2 based on the startup outside air temperature. Specifically, the temperature estimating part sets the first cumulative air amount Mc1 and the second cumulative air amount Mc2 larger when the startup outside air temperature is relatively low compared to when the startup outside air temperature is relatively high.

Next, at step S302, the temperature estimating part judges whether the cumulative air amount ΣMc is smaller than the first cumulative air amount Mc1. If it is judged that the cumulative air amount ΣMc is smaller than the first cumulative air amount Mc1, the present control routine proceeds to step S303. In this case, it is estimated that the estimated temperature of the exhaust pipe 27 is less than the first exhaust pipe temperature, so at step S303, the heater control part sets the target temperature TT of the sensor cell 51 at the first target temperature TT1. The first target temperature TT1 is a temperature higher than the operating temperature OT of the sensor cell 51, for example, is a temperature of 750° C. or more. After step S303, the present control routine ends.

On the other hand, if at step S302 it is judged that the cumulative air amount ΣMc is the first cumulative air amount Mc1 or more, the present control routine proceeds to step S304. At step S304, the temperature estimating part judges whether the cumulative air amount ΣMc is smaller than the second cumulative air amount Mc2. If it is judged that the cumulative air amount ΣMc is smaller than the second cumulative air amount Mc2, the present control routine proceeds to step S305. In this case, it is estimated that the estimated temperature of the exhaust pipe 27 is the first exhaust pipe temperature to less than the second exhaust pipe temperature, so at step S305, the heater control part sets the target temperature TT of the sensor cell 51 at the second target temperature TT2. The second target temperature TT2 is a temperature higher than the operating temperature OT of the sensor cell 51 and lower than the first target temperature TT1, for example, is a temperature of 650° C. to 700° C. After step S305, the present control routine is ended.

On the other hand, if at step S304 it is judged that the cumulative air amount ΣMc is the second cumulative air amount Mc2 or more, the present control routine proceeds to step S306. In this case, it is estimated that the estimated temperature of the exhaust pipe 27 is the second exhaust pipe temperature or more, so at step S306, the heater control part sets the target temperature TT at the operating temperature OT. The operating temperature OT is a temperature of the activation temperature of the sensor cell 51 or more, for example, is a temperature of 600° C. to 650° C. After step S306, the present control routine ends. Note that, the cumulative air amount ΣMc is reset to zero when stopping the internal combustion engine 1.

Fifth Embodiment

The configuration and the control of the control system of an exhaust sensor according to the fifth embodiment are basically similar to the configuration and the control of the control system of an exhaust sensor according to the first embodiment except for the points explained below. For this reason, below, the fifth embodiment of the present invention will be explained focusing on the parts different from the first embodiment.

Figure 10:
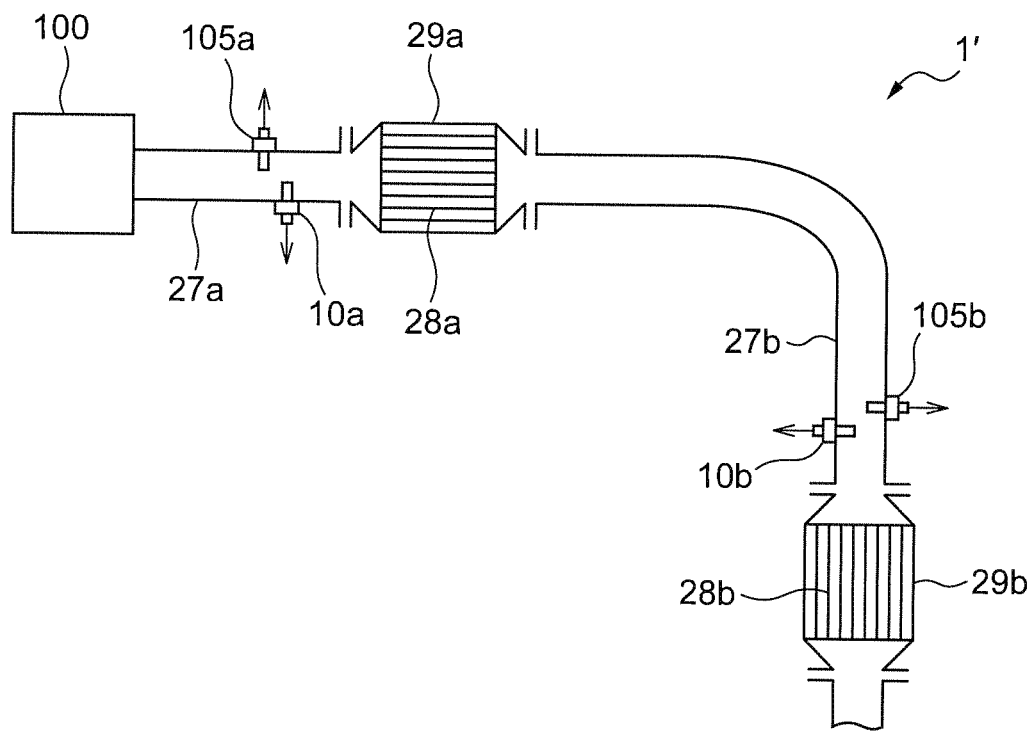
FIG. 10 is a view schematically showing an internal combustion engine in which a control system of an exhaust sensor according to a fifth embodiment of the present invention is used.

FIG. 10 is a view schematically showing an internal combustion engine 1' in which a control system of an exhaust sensor according to the fifth embodiment of the present invention is used. In the internal combustion engine 1', two air-fuel ratio sensors 10a, 10b and two exhaust purification catalysts 28a, 28b are provided. The upstream side exhaust pipe 27a connects the engine body 100 and the upstream side casing 29a. The downstream side exhaust pipe 27b connects the upstream side casing 29a and the downstream side casing 29b. The upstream side casing 29a has a built-in upstream side exhaust purification catalyst 28a. The downstream side casing 29b has a built-in downstream side exhaust purification catalyst 28b. Further, the upstream side exhaust temperature sensor 105a is arranged in the upstream side exhaust pipe 27a near the upstream side air-fuel ratio sensor 10a, while the downstream side exhaust temperature sensor 105b is arranged in the downstream side exhaust pipe 27b near the downstream side air-fuel ratio sensor 10b.

The upstream side air-fuel ratio sensor 10a is arranged at the upstream side exhaust pipe 27a at the upstream side from the upstream side exhaust purification catalyst 28a in the direction of exhaust flow, while the downstream side air-fuel ratio sensor 10b is arranged at the downstream side exhaust pipe 27b at the downstream side from the upstream side exhaust purification catalyst 28a in the direction of exhaust flow. Therefore, the downstream side air-fuel ratio sensor 10b is positioned at the downstream side of the upstream side air-fuel ratio sensor 10a in the direction of exhaust flow. For example, the upstream side air-fuel ratio sensor 10a is arranged in the engine compartment of the vehicle at which the internal combustion engine 1' is mounted, while the downstream side air-fuel ratio sensor 10b is arranged below the floor of the vehicle at which the internal combustion engine 1' is mounted.

The downstream side exhaust pipe 27b is separated from the combustion chambers 2 more than the upstream side exhaust pipe 27a, so after startup of the internal combustion engine 1', the rise in the temperature of the downstream side exhaust pipe 27b due to the exhaust gas becomes slower than the rise in the temperature of the upstream side exhaust pipe 27a. For this reason, the amount of condensed water generated at the downstream side exhaust pipe 27b becomes greater than the amount of condensed water generated at the upstream side exhaust pipe 27a. Therefore, the amount of drops of water striking the sensor element 12 together with the exhaust gas becomes greater at the downstream side air-fuel ratio sensor 10b than at the upstream side air-fuel ratio sensor 10a. Further, condensed water produced inside the exhaust passage easily pools below the floor of the vehicle compared with the engine compartment of the vehicle. For this reason, if the downstream side air-fuel ratio sensor 10b is arranged below the floor of the vehicle, the amount of drops of water striking the sensor element of the downstream side air-fuel ratio sensor 10b becomes greater.

Therefore, in the fifth embodiment, the heater control part sets the first target temperature and the second target temperature at the downstream side air-fuel ratio sensor 10b higher than the first target temperature and the second target temperature at the upstream side air-fuel ratio sensor 10a. Due to this, even if an internal combustion engine is provided with a plurality of air-fuel ratio sensors, it is possible to more effectively suppress increase of the power consumption of the heater while preventing cracking of the element of the air-fuel ratio sensor due to being wetted by water.

Note that, the number of exhaust purification catalysts arranged in the exhaust passage may be other than two. Further, the number of air-fuel ratio sensors arranged in the exhaust passage may be made greater than two. In this case, the target temperature of the sensor cell is set higher the more to the downstream side of the direction of exhaust flow the air-fuel ratio sensor is positioned at.

<Explanation of Control Using Time Chart>

Figure 11:
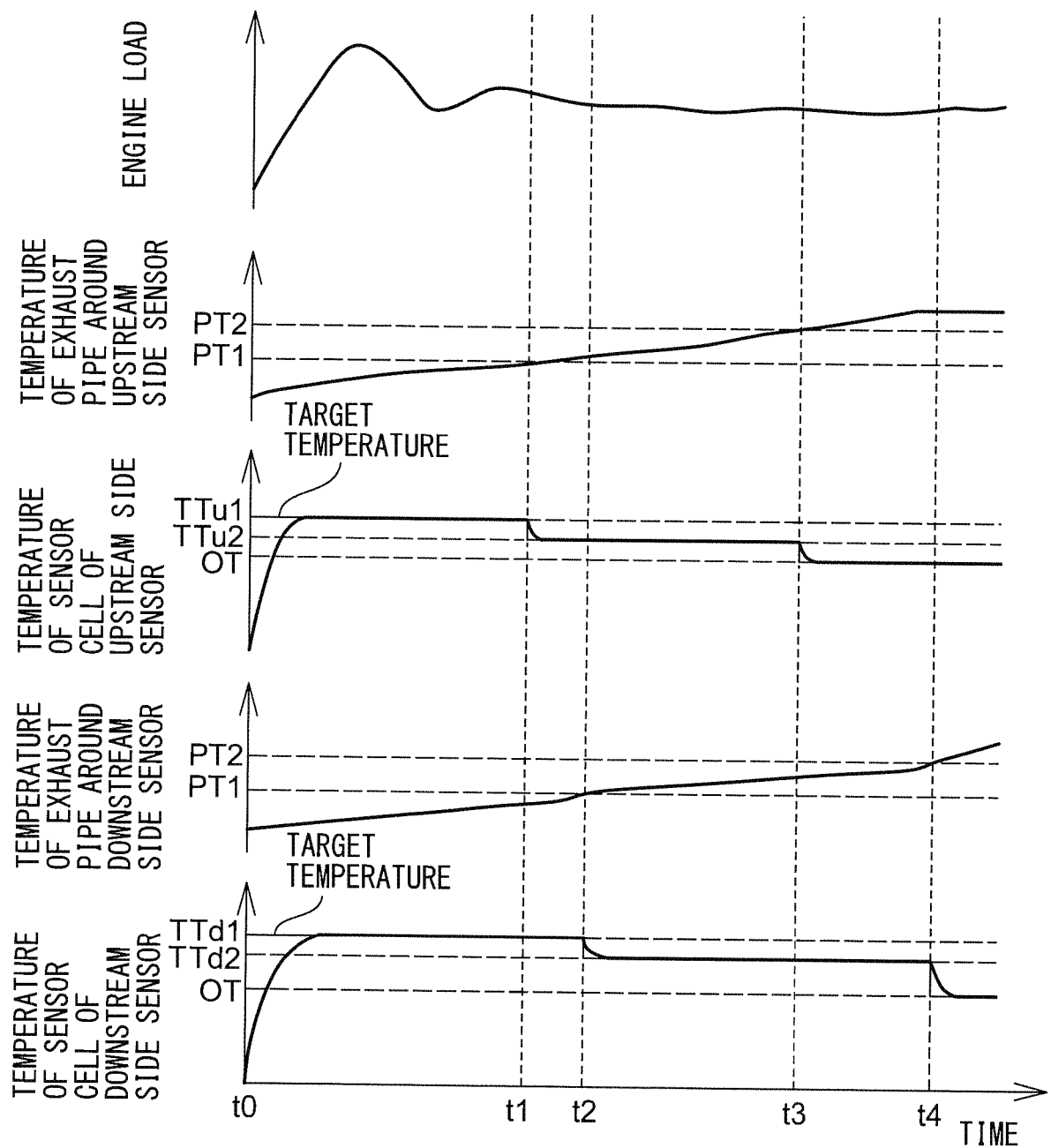
FIG. 11 is a schematic time chart of an engine load etc. when making an internal combustion engine start up.

Below, referring to the time chart of FIG. 11, control at the fifth embodiment will be specifically explained. FIG. 11 is a schematic time chart of the parameters when making the internal combustion engine 1 start up such as the engine load, the temperature of the upstream side exhaust pipe 27a around the upstream side air-fuel ratio sensor 10a, the sensor cell temperature of the upstream side air-fuel ratio sensor 10a, the temperature of the downstream side exhaust pipe 27b around the downstream side air-fuel ratio sensor 10b, and the sensor cell temperature of the downstream side air-fuel ratio sensor 10b. In the graph of the sensor cell temperature, the target temperature of the sensor cell is shown by the fine lines. In the illustrated example, the temperatures of the exhaust pipes 27a, 27b around the air-fuel ratio sensors 10a, 10b are respectively calculated from the outputs of the exhaust temperature sensors 105a, 105b. Further, the temperature of the sensor element 12 is calculated based on the impedance of the sensor cell.

In the illustrated example, the internal combustion engine 1 is started up at the time t0. When the internal combustion engine 1 is started up, the target temperature of the sensor cell of the upstream side air-fuel ratio sensor 10a is set to the first target temperature TTu1 while the target temperature of the sensor cell of the downstream side air-fuel ratio sensor 10b is set to the first target temperature TTd1. The first target temperature TTd1 at the downstream side air-fuel ratio sensor 10b is higher than the first target temperature TTu1 at the upstream side air-fuel ratio sensor 10a. As a result, after the time t0, the sensor cell temperature of the upstream side air-fuel ratio sensor 10a rises toward the first target temperature TTu1 while the sensor cell temperature of the downstream side air-fuel ratio sensor 10b rises toward the first target temperature TTd1.

At the time t1, the temperature of the upstream side exhaust pipe 27a around the upstream side air-fuel ratio sensor 10a reaches the first exhaust pipe temperature PT1. The first exhaust pipe temperature PT1 is for example the dew point of water (54° C.). At the time t2, the target temperature of the sensor cell of the upstream side air-fuel ratio sensor 10a is switched from the first target temperature TTu1 to the second target temperature TTu2. As a result, after the time t2, the sensor cell temperature of the upstream side air-fuel ratio sensor 10a falls toward the second target temperature TTu2.

At the time t2, the temperature of the downstream side exhaust pipe 27b around the downstream side air-fuel ratio sensor 10b reaches the first exhaust pipe temperature PT1. At the time t2, the target temperature of the sensor cell of the downstream side air-fuel ratio sensor 10b is switched from the first target temperature TTd1 to the second target temperature TTd2. The second target temperature TTd2 at the downstream side air-fuel ratio sensor 10b is higher than the second target temperature TTu2 at the upstream side air-fuel ratio sensor 10a. As a result, after the time t2, the sensor cell temperature of the downstream side air-fuel ratio sensor 10b falls toward the second target temperature TTd2.

At the time t3, the temperature of the upstream side exhaust pipe 27a around the upstream side air-fuel ratio sensor 10a reaches the second exhaust pipe temperature PT2. The second exhaust pipe temperature PT2 is for example the boiling point of water (100° C.). At the time t3, the target temperature of the sensor cell of the upstream side air-fuel ratio sensor 10a is switched from the second target temperature TTu2 to the operating temperature OT of the sensor cell. As a result, after the time t3, the sensor cell temperature of the upstream side air-fuel ratio sensor 10a falls toward the operating temperature OT.

At the time t4, the temperature of the downstream side exhaust pipe 27b around the downstream side air-fuel ratio sensor 10b reaches the second exhaust pipe temperature PT2. At the time t4, the target temperature of the sensor cell of the downstream side air-fuel ratio sensor 10b is switched from the second target temperature TTd2 to the operating temperature OT of the sensor cell. As a result, after the time t4, the sensor cell temperature of the downstream side air-fuel ratio sensor 10b falls toward the operating temperature OT.

<Processing for Setting Target Temperature>

In the fifth embodiment, the control routine shown in FIG. 7 is performed for the upstream side air-fuel ratio sensor 10a and the downstream side air-fuel ratio sensor 10b. At this time, the first target temperature and the second target temperature at the downstream side air-fuel ratio sensor 10b are made higher than the first target temperature and the second target temperature at the upstream side air-fuel ratio sensor 10a. Note that, in the fifth embodiment, instead of the control routine shown in FIG. 7, the control routine shown in FIG. 8 or FIG. 9 may be used. In this case as well, the first target temperature and the second target temperature at the downstream side air-fuel ratio sensor 10b are made higher than the first target temperature and the second target temperature at the upstream side air-fuel ratio sensor 10a.

Sixth Embodiment

The configuration and the control of the control system of an exhaust sensor according to the sixth embodiment are basically similar to the configuration and the control of the control system of an exhaust sensor according to the first embodiment except for the points explained below. For this reason, below, the sixth embodiment of the present invention will be explained focusing on the parts different from the first embodiment.

In the sixth embodiment, the control system of an exhaust sensor is provided with a water quantity estimating part estimating the amount of condensed water in the exhaust passage at the upstream side of the air-fuel ratio sensor 10 in the direction of exhaust flow. The heater control part sets the target temperature of the sensor cell 51 to a temperature of the operating temperature of the sensor cell 51 or more based on the amount of condensed water estimated by the water quantity estimating part after startup of the internal combustion engine 1. Specifically, the heater control part sets the target temperature of the sensor cell 51 higher when the estimated amount of condensed water is relatively larger compared with when the estimated amount of condensed water is relatively small. In other words, the heater control part makes the target temperature of the sensor cell 51 higher in stages (in steps) or linearly as the estimated amount of condensed water becomes larger.

As explained above, the temperature at which the Leidenfrost phenomenon occurs becomes higher the greater the amount of drops of water striking the sensor element 12 (see FIG. 4). Further, the amount of drops of water striking the sensor element 12 becomes greater the greater the amount of condensed water inside the exhaust passage. For this reason, it is possible to set the target temperature of the sensor cell 51 based on the estimated amount of condensed water to more effectively suppress the increase in power consumption of the heater while preventing cracking of the element of the exhaust sensor due to being wetted by water.

The water quantity estimating part estimates the amount of condensed water inside the exhaust passage at the upstream side of the air-fuel ratio sensor 10 in the direction of exhaust flow by, for example, a known method such as described in PLT 3. Below, the method of estimation of the condensed water will be simply explained.

The water quantity estimating part calculates the amount of increase of condensed water based on the amount of water vapor generated per unit time due to combustion of the air-fuel mixture at the combustion chambers 2 and the condensation ratio, and cumulatively adds the amounts of increase of condensed water so as to estimate the amount of condensed water inside the exhaust passage. The condensation ratio is the ratio by which the water vapor inside the exhaust gas condenses inside the exhaust passage.

The amount of water vapor generated per unit time is calculated based on the amount of intake air per unit time and the amount of fuel injection per unit time. The condensation ratio is calculated based on the exhaust gas temperature (for example, exhaust gas temperature near the exhaust port) and the temperature of the exhaust pipe 27 near the air-fuel ratio sensor 10. The exhaust gas temperature is, for example, calculated based on the intake air amount, engine speed, etc. The temperature of the exhaust pipe 27 is for example calculated from the output of the exhaust temperature sensor 105. Further, the temperature of the exhaust pipe 27, as described in the explanation of the first embodiment, may be calculated based on the elapsed time or the cumulative air amount from when the internal combustion engine 1 is started up.

<Processing for Setting Target Temperature>

Figure 12:
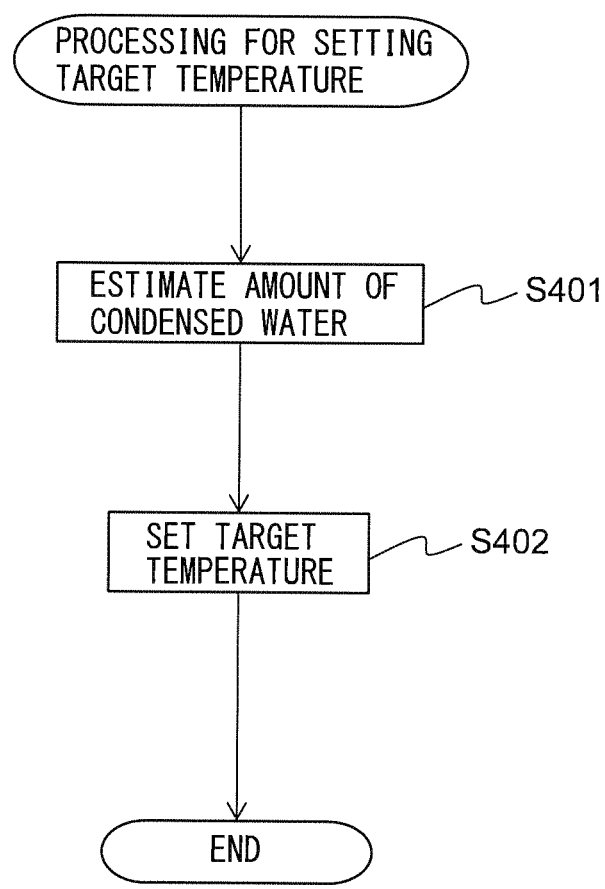
FIG. 12 is a flow chart showing a control routine of processing for setting a target temperature in a sixth embodiment of the present invention.

FIG. 12 is a flow chart showing a control routine of processing for setting a target temperature at a sixth embodiment of the present invention. The present control routine is performed by the ECU 80 repeatedly at predetermined time intervals after startup of the internal combustion engine 1.

First, at step S401, the water quantity estimating part estimates the amount of condensed water in the exhaust passage at the upstream side of the air-fuel ratio sensor 10 in the direction of exhaust flow. Next, at step S402, the heater control part estimates the target temperature of the sensor cell 51 based on the amount of condensed water estimated at step S401. After step S402, the present control routine is ended.

Above, preferable embodiments according to the present invention were explained, but the present invention is not limited to these embodiments and can be corrected and changed in various ways within the scope of the claims. For example, the exhaust sensor controlled by the control system of an exhaust sensor may be an oxygen sensor detecting whether the air-fuel ratio of the exhaust gas is rich or lean. Further, the exhaust sensor may be a nitrogen oxide sensor ($NO_x$ sensor) detecting the concentration of nitrogen oxides ($NO_x$) in the exhaust gas, a sulfur oxide sensor ($SO_x$ sensor) detecting the concentration of sulfur oxides ($SO_x$) in the exhaust gas, etc.

Further, the element body of the exhaust sensor may be provided with not only a sensor cell, but also the other electrochemical cells. The other electrochemical cells are, for example, a pump cell discharging oxygen in the measured gas from the measured gas chamber, a monitor cell detecting the concentration of a specific component in the measured gas, etc. In this case, the heater control part may set the target temperature of the pump cell or monitor cell, and control the heater so that the temperature of the pump cell or monitor cell becomes the target temperature. The temperature of the pump cell or monitor cell is calculated from its impedance.

REFERENCE SIGNS LIST 1. internal combustion engine
10. air-fuel ratio sensor
12. sensor element
50. element body
51. sensor cell
55. heater
60. protective layer
80. electronic control unit (ECU)

The invention claimed is:

1. A control system of an exhaust sensor controlling the exhaust sensor arranged in an exhaust passage of an internal combustion engine and detecting a specific component in exhaust gas, wherein
the exhaust sensor comprises an element body provided with an electrochemical cell, a protective layer formed on an outer surface of the element body and comprised of a porous ceramic, and a heater heating the element body and the protective layer,
the control system comprises an electronic control unit (ECU), wherein
the ECU is programmed to
set a target temperature of the electrochemical cell,
control the heater so that a temperature of the electrochemical cell becomes the target temperature, and
estimate a temperature of an exhaust pipe around the exhaust sensor, wherein
the ECU is further programmed to
set the target temperature of the electrochemical cell to a first target temperature after startup of the internal combustion engine and until the estimated temperature of the exhaust pipe reaches a first exhaust pipe temperature, set the target temperature of the electrochemical cell to a second target temperature from when the estimated temperature of the exhaust pipe reaches the first exhaust pipe temperature to when the estimated temperature of the exhaust pipe reaches a second exhaust pipe temperature, and set the target temperature of the electrochemical cell to an operating temperature of the electrochemical cell when the estimated temperature of the exhaust pipe reaches the second exhaust pipe temperature, wherein the first exhaust pipe temperature is a temperature of a dew point of water to less than a boiling point of water, the second exhaust pipe temperature is a temperature of the boiling point of water or more, the first target temperature is a temperature higher than the operating temperature, and the second target temperature is a temperature higher than the operating temperature and lower than the first target temperature.

2. The control system of the exhaust sensor according to claim 1, wherein the ECU is further programmed to estimate or detect an outside air temperature of the internal combustion engine, and set the first target temperature higher when the estimated or detected outside air temperature at a time of startup of the internal combustion engine is lower than another detected outside air temperature.

3. The control system of the exhaust sensor according to claim 2, wherein the ECU is further programmed to judge that the estimated temperature of the exhaust pipe has reached the first exhaust pipe temperature when an elapsed time from when the internal combustion engine is started up reaches a first elapsed time, and judge that the estimated temperature of the exhaust pipe has reached the second exhaust pipe temperature when the elapsed time reaches a second elapsed time longer than the first elapsed time, estimate or detect the outside air temperature of the internal combustion engine, and set the first elapsed time and the second elapsed time longer when the estimated or detected outside air temperature at the time of startup of the internal combustion engine is lower than another detected outside air temperature.

4. The control system of the exhaust sensor according to claim 3, wherein the control system further includes an upstream side exhaust sensor, and a downstream side exhaust sensor positioned at a downstream side of the upstream side exhaust sensor in a direction of exhaust flow, and the ECU is further programmed to set the first target temperature and the second target temperature at the downstream side exhaust sensor higher than the first target temperature and the second target temperature at the upstream side exhaust sensor.

5. The control system of the exhaust sensor according to claim 2, wherein the ECU is further programmed to judge that the estimated temperature of the exhaust pipe has reached the first exhaust pipe temperature when a cumulative value of an intake air amount supplied to combustion chambers of the internal combustion engine from when the internal combustion engine is started up reaches a first cumulative air amount, and judge that the estimated temperature of the exhaust pipe has reached the second exhaust pipe temperature when the cumulative value reaches a second cumulative air amount greater than the first cumulative air amount, estimate or detect the outside air temperature of the internal combustion engine, and set the first cumulative air amount and the second cumulative air amount greater when the estimated or detected outside air temperature at the time of startup of the internal combustion engine is lower than another detected outside air temperature.

6. The control system of the exhaust sensor according to claim 5, wherein the control system further includes an upstream side exhaust sensor, and a downstream side exhaust sensor positioned at a downstream side of the upstream side exhaust sensor in a direction of exhaust flow, and the ECU is further programmed to set the first target temperature and the second target temperature at the downstream side exhaust sensor higher than the first target temperature and the second target temperature at the upstream side exhaust sensor.

7. The control system of the exhaust sensor according to claim 2, wherein the control system further includes an upstream side exhaust sensor, and a downstream side exhaust sensor positioned at a downstream side of the upstream side exhaust sensor in a direction of exhaust flow, and the ECU is further programmed to set the first target temperature and the second target temperature at the downstream side exhaust sensor higher than the first target temperature and the second target temperature at the upstream side exhaust sensor.

8. The control system of the exhaust sensor according to claim 1, wherein the ECU is further programmed to judge that the estimated temperature of the exhaust pipe has reached the first exhaust pipe temperature when an elapsed time from when the internal combustion engine is started up reaches a first elapsed time, and judge that the estimated temperature of the exhaust pipe has reached the second exhaust pipe temperature when the elapsed time reaches a second elapsed time longer than the first elapsed time, estimate or detect an outside air temperature of the internal combustion engine, and set the first elapsed time and the second elapsed time longer when the estimated or detected outside air temperature at a time of startup of the internal combustion engine is lower than another detected outside air temperature.

9. The control system of the exhaust sensor according to claim 8, wherein the control system further includes an upstream side exhaust sensor, and a downstream side exhaust sensor positioned at a downstream side of the upstream side exhaust sensor in a direction of exhaust flow, and the ECU is further programmed to set the first target temperature and the second target temperature at the downstream side exhaust sensor higher than the first target temperature and the second target temperature at the upstream side exhaust sensor.

10. The control system of the exhaust sensor according to claim 1, wherein the ECU is further programmed to judge that the estimated temperature of the exhaust pipe has reached the first exhaust pipe temperature when a cumulative value of an intake air amount supplied to combustion chambers of the internal combustion engine from when the internal combustion engine is started up reaches a first cumulative air amount, and judge that the estimated temperature of the exhaust pipe has reached the second exhaust pipe temperature when the cumulative value reaches a second cumulative air amount greater than the first cumulative air amount, estimate or detect an outside air temperature of the internal combustion engine, and set the first cumulative air amount and the second cumulative air amount greater when the estimated or detected outside air temperature at a time of startup of the internal combustion engine is lower than another detected outside air temperature.

11. The control system of the exhaust sensor according to claim 10, wherein the control system further includes an upstream side exhaust sensor, and a downstream side exhaust sensor positioned at a downstream side of the upstream side exhaust sensor in a direction of exhaust flow, and the ECU is further programmed to set the first target temperature and the second target temperature at the downstream side exhaust sensor higher than the first target temperature and the second target temperature at the upstream side exhaust sensor.

12. The control system of the exhaust sensor according to claim 1, wherein the control system further includes an upstream side exhaust sensor, and a downstream side exhaust sensor positioned at a downstream side of the upstream side exhaust sensor in a direction of exhaust flow, and the ECU is further programmed to set the first target temperature and the second target temperature at the downstream side exhaust sensor higher than the first target temperature and the second target temperature at the upstream side exhaust sensor.

13. A control system of an exhaust sensor controlling the exhaust sensor arranged in an exhaust passage of an internal combustion engine and detecting a specific component in exhaust gas, wherein the exhaust sensor comprises an element body provided with an electrochemical cell, a protective layer formed on an outer surface of the element body and comprised of a porous ceramic, and a heater heating the element body and the protective layer, the control system comprises an electronic control unit (ECU), wherein the ECU is programmed to set a target temperature of the electrochemical cell, control the heater so that a temperature of the electrochemical cell becomes the target temperature, and estimate an amount of condensed water in the exhaust passage upstream from the exhaust sensor in a direction of exhaust flow, wherein the ECU is programmed to make the target temperature higher as the amount of condensed water increases after startup of the internal combustion engine.

14. A control system of an exhaust sensor controlling the exhaust sensor arranged in an exhaust passage of an internal combustion engine and detecting a specific component in exhaust gas, wherein the exhaust sensor comprises an element body provided with an electrochemical cell, a protective layer formed on an outer surface of the element body and comprised of a porous ceramic, and a heater heating the element body and the protective layer, the control system comprises an electronic control unit (ECU), wherein the ECU is programmed to estimate a temperature of an exhaust pipe around the exhaust sensor, set a target temperature of the electrochemical cell to a first target temperature after startup of the internal combustion engine, set the target temperature of the electrochemical cell to a second target temperature from when the estimated temperature of the exhaust pipe reaches a first exhaust pipe temperature to when the estimated temperature of the exhaust pipe reaches a second exhaust pipe temperature, and set the target temperature of the electrochemical cell to an operating temperature of the electrochemical cell when the estimated temperature of the exhaust pipe reaches the second exhaust pipe temperature, wherein the first exhaust pipe temperature is a temperature of a dew point of water to less than a boiling point of water, the second exhaust pipe temperature is a temperature of the boiling point of water or more, the first target temperature is a temperature higher than the operating temperature, and the second target temperature is a temperature higher than the operating temperature and lower than the first target temperature, wherein the ECU is programmed to control the heater so that the temperature of the electrochemical cell becomes the first target temperature, and maintain the temperature of the electrochemical cell at the first target temperature until the estimated temperature of the exhaust pipe reaches the first exhaust pipe temperature;

control the heater so that the temperature of the electrochemical cell becomes the second target temperature, and maintain the temperature of the electrochemical cell at the second target temperature until the estimated temperature of the exhaust pipe reaches the second exhaust pipe temperature; and control the heater so that the temperature of the electrochemical cell becomes the operating temperature.

* * * * *